US010445574B2

(12) United States Patent
Odinokikh et al.

(10) Patent No.: US 10,445,574 B2
(45) Date of Patent: Oct. 15, 2019

(54) METHOD AND APPARATUS FOR IRIS RECOGNITION

(71) Applicant: Samsung Electronics Co., Ltd., Suwon-si, Gyeonggi-do (KR)

(72) Inventors: Gleb Andreevich Odinokikh, Moscow (RU); Vitaly Sergeevich Gnatyuk, Moscow (RU); Aleksei Mikhailovich Fartukov, Moscow (RU); Vladimir Alekseevich Eremeev, Moscow (RU); Mikhail Vladimirovich Korobkin, Moscow (RU); Aleksei Bronislavovich Danilevich, Moscow (RU); Dae-kyu Shin, Suwon-si (KR); Ju-woan Yoo, Anyang-si (KR); Kwang-hyun Lee, Suwon-si (KR); Hee-jun Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 112 days.

(21) Appl. No.: 15/652,651

(22) Filed: Jul. 18, 2017

(65) Prior Publication Data
US 2018/0018516 A1    Jan. 18, 2018

(30) Foreign Application Priority Data

Jul. 18, 2016  (RU) ............................... 2016129250
Jun. 5, 2017   (KR) ........................ 10-2017-0069773

(51) Int. Cl.
*G06K 9/00* (2006.01)

(52) U.S. Cl.
CPC .......... *G06K 9/00617* (2013.01); *G06K 9/00* (2013.01); *G06K 9/0061* (2013.01); *G06K 9/00604* (2013.01)

(58) Field of Classification Search
CPC .......... G06K 9/00597; G06K 9/00617; G06K 9/00604; G06K 9/0061
(Continued)

(56) References Cited

U.S. PATENT DOCUMENTS

| 6,152,563 A | 11/2000 | Hutchinson et al. |
| 7,627,147 B2 | 12/2009 | Loiacono et al. |

(Continued)

FOREIGN PATENT DOCUMENTS

| JP | H07-313459 A | 12/1995 |
| JP | 2001-017411 A | 1/2001 |

(Continued)

OTHER PUBLICATIONS

Information technology—Biometric sample quality—Part 6: Iris image data, ISO/IEC 29794-6:2015, Jul. 3, 2015, pp. 1-29, XP082007230, Geneva, Switzerland.

(Continued)

*Primary Examiner* — Ali Bayat
(74) *Attorney, Agent, or Firm* — Jefferson IP Law, LLP

(57) ABSTRACT

An apparatus for recognizing an iris is provided. The apparatus includes an image acquisition module configured to acquire a plurality of images, and a processor configured to select at least one image for iris recognition from among the plurality of images based on pupil information of each of the plurality of images, and recognize an iris in at least one image, wherein the pupil information includes at least one of information about a pupil radius and information about a pupil contrast.

20 Claims, 30 Drawing Sheets

(58) Field of Classification Search
USPC .......................................................... 382/117
See application file for complete search history.

(56) References Cited

U.S. PATENT DOCUMENTS

| | | | |
|---|---|---|---|
| 8,050,463 | B2 | 11/2011 | Hamza |
| 8,280,119 | B2 | 10/2012 | Hamza |
| 8,306,279 | B2 | 11/2012 | Hanna |
| 2007/0036397 | A1* | 2/2007 | Hamza ............... G06K 9/00597 382/117 |
| 2008/0075335 | A1* | 3/2008 | Martin ............... G06K 9/00604 382/117 |
| 2010/0142765 | A1 | 6/2010 | Hamza |
| 2010/0266165 | A1 | 10/2010 | Matey et al. |
| 2011/0150334 | A1* | 6/2011 | Du ..................... G06K 9/00604 382/173 |
| 2014/0205156 | A1* | 7/2014 | Tosa .................... G06K 9/0061 382/117 |
| 2015/0071503 | A1* | 3/2015 | Prabhakar ............ G06K 9/0061 382/117 |
| 2016/0012275 | A1 | 1/2016 | Bergen |
| 2016/0019422 | A1 | 1/2016 | Savvides et al. |
| 2016/0078293 | A1* | 3/2016 | Hanna ................ G06K 9/00617 382/117 |
| 2016/0104043 | A1 | 4/2016 | Lee et al. |

FOREIGN PATENT DOCUMENTS

| | | |
|---|---|---|
| JP | 2004-86614 A | 3/2004 |
| KR | 10-0296305 B1 | 7/2001 |
| RU | 2316051 C2 | 1/2008 |
| WO | 2004/029863 A1 | 4/2004 |
| WO | 2008/141460 A1 | 11/2008 |
| WO | 2009-029638 A | 3/2009 |

OTHER PUBLICATIONS

Davide Zoccolan et al., A Self-Calibrating, Camera-Based Eye Tracker for the Recording of Rodent Eye Movements, Frontiers in Neuroscience, Article 193, vol. 4, May 30, 2014, pp. 1-12, XP055575121.

European Partial Search Report dated Apr. 10, 2019, issued in European Patent Application No. 17831310.2.

S. Subbaraman et al., Reduction of false rejection rate of iris recognition system, May 13, 2010, XP009514508.

Helio Amante Miot et al., Comparative evaluation of oculometric variables in Graves' ophthalmopathy, 2009, XP055603249.

Toshitsugu Hirohi et al., Vertical enlargement of the palpebral aperture by static shortening of the anterior and posterior lamellae of the lower eyelid: a cosmetic option for Asian eyelids, XP055603435.

George W. Quinn et al., IREX V—Guidance for iris image collection, Jul. 2, 2014, XP055603941.

Shejin Thavalengal et al., Iris authentication in handheld devices—Considerations for Constraint-Fee Acquisition, May 2015, XP011662572.

Jinyu Zuo et al., Global and local quality measures for NIR iris video, Jun. 20, 2009, XP031512348.

J. M. Chaskar et al., Iris image quality assessment for biometric application, May 2012, XP055603965.

Donald M. Monro et al., DCT-based iris recognition, Apr. 2007, XP011168498.

Extended European Search Report dated Jul. 19, 2019, issued in European Patent Application No. 17831310.2-1207.

* cited by examiner

CENTER AREA (620)

METHOD AND APPARATUS FOR IRIS RECOGNITION

CROSS-REFERENCE TO RELATED APPLICATION(S)

This application claims the benefit under 35 U.S.C. § 119(a) of a Russian patent application filed on Jul. 18, 2016 in the Russian Patent Office and assigned Serial number 2016129250, and of a Korean patent application filed on Jun. 5, 2017 in the Korean Intellectual Property Office and assigned Serial number 10-2017-0069773, the entire disclosure of each of which is hereby incorporated reference.

TECHNICAL FIELD

The present disclosure relates to a method and apparatus for iris recognition. More particularly, the present disclosure relates to a method and apparatus for recognizing an iris by performing multi-staged checks on a plurality of obtained images based on various quality criteria and performing iris recognition only on the images that passed the multi-staged checks, thereby increasing recognition accuracy and reducing resource consumption.

BACKGROUND

An electronic apparatus may store information related to privacy, such as user location information, notes, financial transactions, etc., as well as data such as contacts, call history, messages, etc. In order to protect such information related to privacy, the electronic apparatus may be provided with various security functions. In particular, a method of maintaining security of an electronic apparatus by using user biometric information has been widely used. Such a method of maintaining the security of the electronic apparatus by using the biometric information may include fingerprint recognition, face recognition, iris recognition, etc.

Iris recognition is an identification technology for security purposes that uses characteristics of irises which differ among individuals. In addition, iris recognition may be accomplished by using a camera without any direct physical contact. A process of iris recognition, performed by an apparatus, may include acquiring an image, detecting an eye in the image to obtain an eye image, segmenting an iris of the eye, normalizing the iris image, creating a mask, extracting features of the normalized iris image, and encoding the normalized iris image and the mask according to the related art. The encoded iris image (i.e. an iris code) may be compared with a reference image for identification of a person or authentication thereof.

However, the use of the iris recognition technology in mobile devices is associated with a number of problems and difficulties, such as changing environment conditions, for example, indoor or outdoor lighting, sunny or cloudy weather, glasses or contact lenses in the detection area, user interaction difficulties, and performance limitations such as central processing unit (CPU), random access memory (RAM), camera resolution etc., which may degrade iris image quality, delay operations, increase recognition time, and increase processing time. As an example, the quality of an iris image may be significantly degraded due to insufficient iris illumination, a reflection from glasses, high eyelid occlusion, high gaze angle, high pupil deviations, and overexposure etc. Degrading the quality of an iris image results in recognition errors, power excess consumption, and increased user inconvenience.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for recognizing an iris that perform multi-staged checks on a plurality of images based on various quality criteria and perform iris recognition on the images that passed the multi-staged checks.

Another aspect of the present disclosure is to provide a non-transitory computer-readable recording medium storing a program for executing the method on a computer.

Additional aspects will be set forth in part in the description which follows and, in part, will be apparent from the description, or may be learned by practice of the presented embodiments.

In accordance with an aspect of the present disclosure, an apparatus for recognizing an iris is provided. The apparatus includes a camera configured to acquire a plurality of images, and a processor configured to select at least one image for iris recognition from among the plurality of images based on pupil information of each of the plurality of images and recognize an iris in the at least one image, wherein the pupil information comprises a pupil radius information and a pupil contrast information.

In accordance with another aspect of the present disclosure, a method for recognizing an iris is provided. The iris recognition method includes acquiring a plurality of images, and selecting at least one image for iris recognition from among the plurality of images based on pupil information of each of the plurality of images, and recognizing an iris in the at least one image, wherein the pupil information comprises a pupil radius information and a pupil contrast information.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Also, the term "unit" or "module" as used herein may mean a hardware component or a circuit, such as a field-programmable gate array (FPGA) or application-specific integrated circuit (ASIC).

Figure 1:
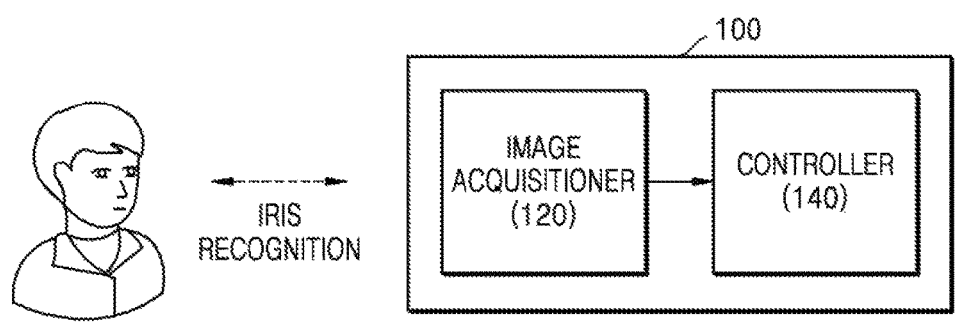
FIG. 1 is a block diagram of an iris recognition apparatus according to an embodiment of the present disclosure.

FIG. 1 is a block diagram of an iris recognition apparatus according to an embodiment of the present disclosure.

The iris recognition apparatus 100 may perform an iris recognition function by comparing an input or a captured image with a previously stored iris image. The iris recognition apparatus 100 may be one of a home appliance such as a television, a washing machine, a refrigerator, a lamp, and a cleaner, a smart phone, a tablet personal computer (PC), a mobile phone, a videophone, an electronic book reader, a desktop PC, a notebook PC, a personal digital assistant (PDA), a portable media player (PMP), an Moving Picture Experts Group phase 1 or phase 2 (MPEG-1 or MPEG-2) audio layer 3 (MP3) player, a mobile medical device, a camera, or a wearable device (for example, electronic glasses, electronic clothes, an electronic bracelet, an electronic necklace, an electronic accessory, an electronic tattoo or a smart watch) but is not limited thereto.

The iris recognition apparatus 100 may include an image acquisitioner 120 and a controller 140. However, not all illustrated components are required. The iris recognition apparatus 100 may be implemented by more components than the illustrated components, and the iris recognition apparatus 100 may be implemented by fewer components. For example, referring to FIG. 3, the iris recognition apparatus 100 may further include a display 110, a memory 130, and an input interface 150. Hereinafter, the components will be described in order.

The image acquisitioner 120 may be a module that is configured to acquire a plurality of images using hardware and software components. For example, the image acquisitioner 120 may acquire an image sequence including a series of images. The image acquisitioner 120 may also acquire a video sequence. The acquired image sequence or the video sequence is not limited by a particular size. The image acquisitioner 120 module may include devices for input (e.g., an illumination sensor, a camera, etc.), devices for output (e.g., a light source to output light), and other processing components to process the images.

Meanwhile, the image acquisitioner 120 may include a camera. The camera may include an internal camera, an external camera, a front camera, a camera with infrared (IR) illumination, or a combination thereof The controller 140 may select at least one image suitable for iris recognition from the plurality of images acquired by the image acquisitioner 120 based on a predetermined quality criterion, and perform iris recognition on the selected image. The controller 140 may be an ASIC, an embedded processor, a microprocessor, hardware control logic, a hardware finite state machine (FSM), a digital signal processor (DSP), or a combination thereof The controller 140 may include at least one processor (not shown).

The controller 140 may discard an image that is determined to be unsuitable for iris recognition, and may select the remaining image as an image suitable for iris recognition. The discarding of the image means that the image is judged as an image irrelevant to iris recognition and is not used for iris recognition or the corresponding image judged to be irrelevant to the iris recognition is deleted from storage (not shown) but is not limited thereto. The discarded image is not used in a final iris matching process.

The predetermined quality criteria for selecting at least one image suitable for iris recognition may include pupil information. The pupil information may include at least one of information on a pupil radius and information on a pupil contrast. The controller 140 may generate an ellipse approximating each of one or more light figures included in each of the plurality of images, and calculate one of the one or more light figures as a pupil glare area based on an axial ratio, an area, and a contrast of the generated ellipse. The controller 140 may determine a boundary between a pupil and an iris in the determined pupil glare area and determine information about a pupil center and the pupil radius based on the determined boundary between the pupil and the iris.

The controller 140 may discard the image if a radius of the pupil in the image is greater than a predetermined threshold value. A method by which the iris recognition apparatus 100 selects an image suitable for iris recognition based on the radius of the pupil will be described later in detail with reference to FIG. 12.

The controller 140 may discard the image if the pupil contrast in the image is larger than a predetermined threshold value. The pupil contrast may be determined by a deviation in brightness near the boundary of the area determined as the pupil. A method by which the iris recognition apparatus 100 selects an image suitable for iris recognition based on the pupil contrast will be described in detail below with reference to FIG. 12.

Figure 5:
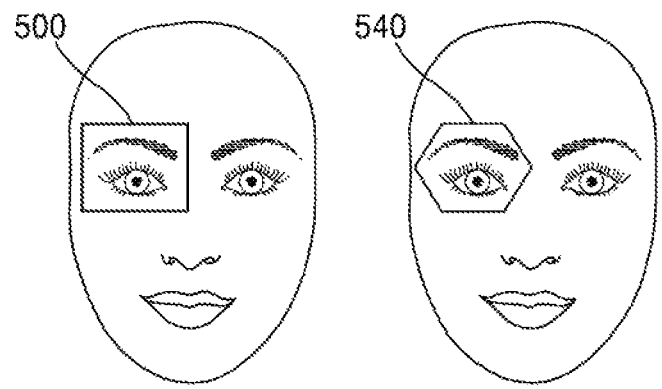
FIG. 5 shows examples of eye areas bounded by different polygons according to an embodiment of the present disclosure.

FIG. 5 shows examples of eye areas bounded by different polygons according to an embodiment of the present disclosure.

Referring to FIG. 5, the controller 140 may acquire eye images for iris recognition and apply a predetermined quality criterion to the acquired eye images. The eye image may refer to a partial image as illustrated an area 500 and an area 540. Hereinafter, an "image" may indicate an entire image or a partial image of the entire image. The controller 140 may detect an eye area for each of the images included in the image sequence based on an image processing algorithm, bind the detected eye area to a polygon, and acquire the eye image.

As described above, the controller 140 may discard the image that is not suitable for iris recognition. For example, the controller 140 may discard the image that is not suitable for iris recognition and may select remaining N images as images suitable for iris recognition. Herein, N is a positive integer and represents a predetermined number of images selected to perform additional operations required for iris recognition. The integer N may be determined to be less than a total number of the plurality of images in the image sequence.

Figure 7:
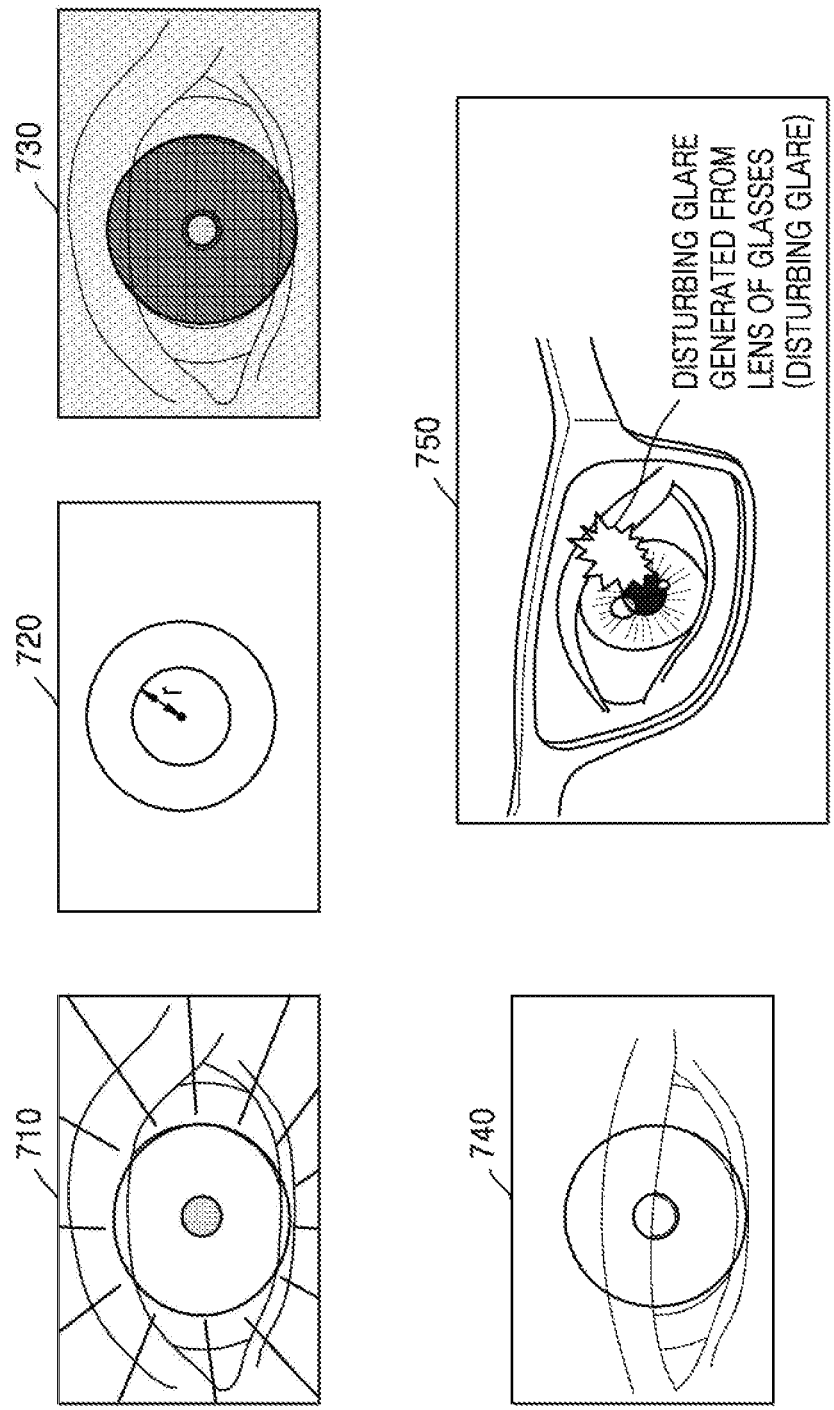
FIG. 7 shows images unsuitable for iris recognition according to an embodiment of the present disclosure.

FIG. 7 shows images unsuitable for iris recognition according to an embodiment of the present disclosure.

Referring to FIG. 7, an iris image 710 illustrates a normal eye. An iris image 720 illustrates a radius of an extracted iris, an iris image 730 illustrates contrast that prevents the iris from being recognized, an iris image 740 illustrates an eyelid obstructing the iris to prevent iris recognition, and an iris image 750 illustrates disturbing glare that prevents iris recognition.

For each of the plurality of images, the controller 140 may check suitability of iris recognition based on one or more criteria, and acquire an image set composed of images that have successfully passed all the checks. The image set may consist of N images of best quality suitable for iris recognition. The controller 140 may determine and discard an image that has not passed any one of various checks based on various criteria as an image that is not suitable for iris recognition and perform the same check on a next image in the image sequence. This process may be repeated up to a last image of the acquired image sequence.

If the number of images selected for iris recognition is less than a predetermined number N, the controller 140 may acquire an additional image sequence until the number of selected images reaches N. The controller 140 may perform iris recognition with a selected image without acquiring additional image sequence even if the number of images selected for iris recognition is less than the predetermined number N.

The controller 140 may further consider image attribute information other than the pupil information to determine whether an image is not suitable for iris recognition among the plurality of images included in the image sequence.

The image attribute information may include at least one of position information of the eye area, contrast of the eye area, brightness of the eye area, an eyelid opening distance, information about a disturbing glare, and information about a distance between the pupil and the disturbing glare. The disturbing glare is a glare caused by reflection of light from the sun or other sources of light onto an eye or a spectacle lens (e.g., glasses, contacts, etc.), which may degrade image quality. The information about the disturbing glare may include information about an area of a disturbing glare area and information about a center of the disturbing glare area.

The controller 140 may discard the image if the eye area is not located in a predetermined center area of each image. Since a peripheral area of an image may be affected by optical distortion, if an eye area recognized in the image is located entirely or partially outside the predetermined center area, the image may be determined to be unsuitable for iris recognition. A method by which the iris recognition apparatus 100 selects an image suitable for iris recognition based on positional information of the eye area will be described in detail below with reference to FIG. 9.

If the average contrast of the eye area in the image is smaller than the threshold value, the controller 140 may discard the image. The contrast of the eye area may be determined by a deviation in the brightness of the eye area. A method by which the iris recognition apparatus 100 selects an image suitable for iris recognition based on the average contrast of the eye area will be described in detail below with reference to FIG. 9.

The controller 140 may discard the image if the average brightness of the eye area in the image is greater than the threshold value. A method by which the iris recognition apparatus 100 selects an image suitable for iris recognition based on the average brightness of the eye area will be described in detail below with reference to FIG. 9.

The controller 140 may discard the image if the eyelid opening distance is less than a predetermined threshold value. The eyelid opening distance may be determined as the shortest vertical distance of an area including the pupil. A method by which the iris recognition apparatus 100 selects an image suitable for iris recognition based on the eyelid opening distance will be described in detail below with reference to FIG. 17.

The controller 140 may discard the image if the area of the disturbing glare area is larger than the threshold value. A method by which the iris recognition apparatus 100 selects an image suitable for iris recognition based on the area of the disturbing glare area will be described in detail below with reference to FIG. 17. Throughout the present specification, the pupil glare and the disturbing glare may mean a pupil glare area and a disturbing glare area, respectively, in an image.

The controller 140 may discard the image if the distance between the pupil glare and the disturbing glare is smaller than a predetermined threshold value. The disturbing glare may block the pupil and iris, blur a portion of the pupil or the iris, and create an eye image unsuitable for subsequent processing. A method by which the iris recognition apparatus 100 selects an image suitable for iris recognition based on the area of the disturbing glare area will be described in detail below with reference to FIG. 17.

The controller may discard an image that is not suitable for iris recognition from a plurality of images and, and, when the number of remaining images is larger than a predetermined number, may additionally select a predetermined number of images to be used for iris recognition. For example, even when the number of selected images is larger than N, the controller 140 may finally select N images based on an image quality value. The image quality value is a numerical value indicating whether or not each image is suitable for iris recognition. The image quality value may be determined based on at least one of a pupil radius, a pupil center, a pupil contrast, and an eyelid opening distance. A method of calculating the image quality value will be described later in detail with reference to FIG. 19.

The controller 140 may sequentially check whether each of the plurality of images included in the image sequence is suitable for iris recognition, and include an image that has passed all the checks in the image set. However, if it is not checked whether all the images in the image sequence are suitable for iris recognition but N images are already included in the image set, the controller 140 may replace the N images included in the image set with a current image in the image sequence that has recently passed a check of whether it is suitable for iris recognition based on the image quality value. A method by which the controller 140 acquires an image set composed of N images will be described in detail below with reference to FIG. 20.

The controller 140 may transmit a feedback signal to a user based on a reason why the image is determined to be unsuitable for iris recognition. For example, the controller 140 may output a message instructing the user to adjust a state of the eyes.

Figure 2:
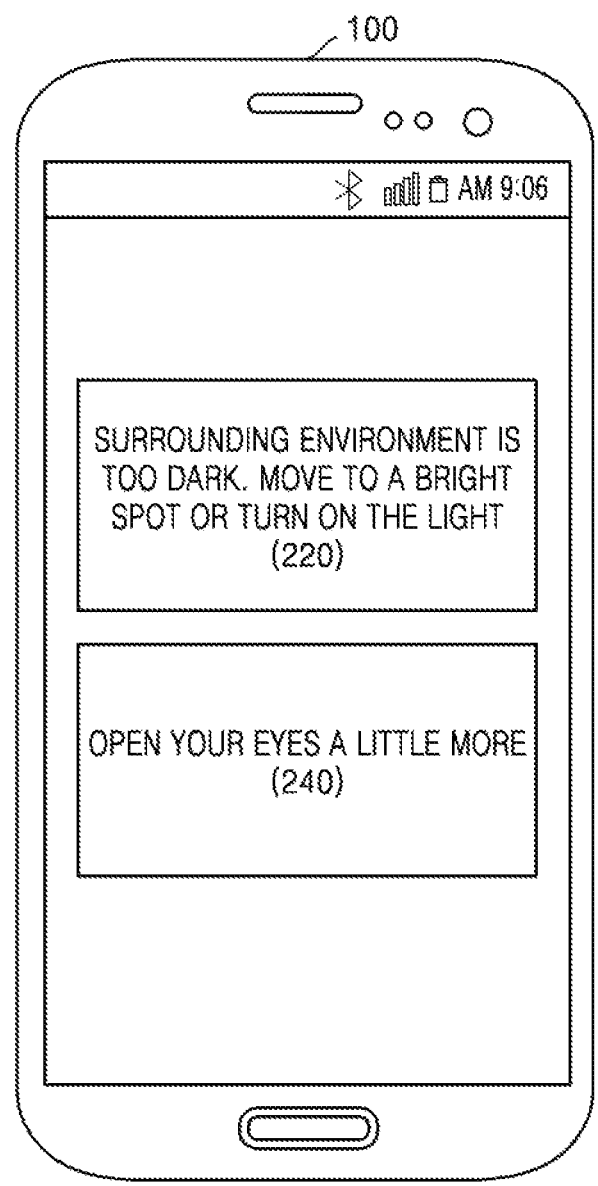
FIG. 2 shows a message output to a user so as to improve quality of an image to be acquired according to an embodiment of the present disclosure.

FIG. 2 shows a message output to a user so as to improve quality of an image to be acquired according to an embodiment of the present disclosure.

The controller 140 may display a message for allowing the user to capture a better image based on a reason for not passing an arbitrary check if the current image does not pass an arbitrary check for determining whether the image is suitable for iris recognition.

Referring to FIG. 2, if the controller 140 determines that the current image is not suitable for iris recognition because of low contrast of the current image, the controller 140 may output a message 220 such as "Surrounding environment is too dark. Move to a bright spot or turn on the light" to the user. Alternatively, if the controller 140 determines that the current image is not suitable for iris recognition because of a small eyelid opening distance of the current image, the controller 140 may output a message 240 such as "Open your eyes a little more" to the user.

The controller 140 may send a feedback signal to a hardware component based on the reason for determining that an image is unsuitable for iris recognition. The controller 140 may deliver to the hardware component all the necessary information to improve quality of the acquired image. The controller 140 may transmit the feedback signal to the image acquisitioner 120.

For example, if the controller 140 determines that the current image is unsuitable for iris recognition due to the low contrast of the current image, the feedback signal may be transmitted to the hardware component (for example, the image acquisitioner 120) of the iris recognition apparatus 100 and may be used to automatically increase an amplification level of an image sequence to be input.

For example, if the controller 140 determines that the current image is not suitable for iris recognition due to a pupil radius larger than a threshold value of the current image (for example, by pupil dilation due to a dark environment, see 720 in FIG. 7), the feedback signal may be transmitted to a hardware component (e.g., the image acquisitioner 120) of the iris recognition apparatus 100 and used to automatically increase a camera exposure value and/or infrared illumination.

For example, if the controller 140 determines that the current image is not suitable for iris recognition because an area of at least one disturbing glare area of the current image exceeds the threshold value, the feedback signal may be transmitted to a hardware component (e.g., the image acquisitioner 120) of the iris recognition apparatus 100 and used to automatically reduce the camera exposure value.

The controller 140 may transmit a feedback signal to at least one of the user and a hardware component based on sensor data received from a sensor embedded in the iris recognition apparatus 100.

For example, based on brightness data received from an illumination sensor that is embedded in the iris recognition apparatus 100, the controller 140 may transmit a feedback signal that may automatically increase the camera exposure value and/or the infrared illumination to a hardware component or may output a message to prompt the user to move to a brighter location.

For example, the controller 140 may transmit a feedback signal which may increase or decrease a camera zoom value to a hardware component, based on distance data received from a distance meter embedded in the iris recognition apparatus 100 or the user may output a message that a distance between the camera and the eye is too far or close to the user.

Accordingly, the iris recognition apparatus 100 may be configured to transmit a feedback signal to the user or control a hardware component to improve the quality of the image sequence to be acquired. The feedback signal is not limited to the above-described example, and other types of feedback signals may also be included.

The controller 140 may perform iris recognition on at least one image selected as an image suitable for iris recognition. The controller 140 may perform iris recognition on the image set composed of the N images determined as images suitable for iris recognition.

Figure 22:
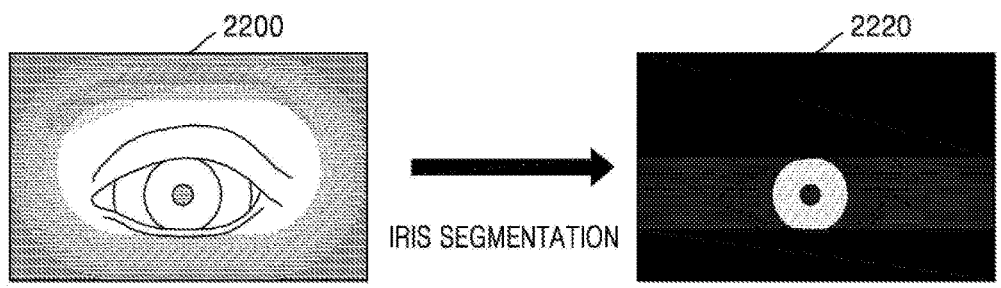
FIG. 22 illustrates iris segmentation according to an embodiment of the present disclosure.

The controller 140 may acquire an iris image for each of selected images. A partial image including an iris area in an image may be referred to as an iris image. The controller 140 may perform iris segmentation to acquire the iris image. Iris segmentation may be performed using an image segmentation algorithm The iris segmentation may include a process of determining a boundary between the pupil and the iris and between a sclera and the iris. A result of performing iris segmentation is shown in FIG. 22. When the iris segmentation is completed, a center and radius of the iris may be estimated. For example, the controller 140 may acquire a set of points describing an outer boundary of the iris, and generate an approximate circle for the acquired set of points using a least squares method. A radius and center of the approximate circle may be considered as a radius and a center of the iris area. A process by which the controller 140 determines the center and radius of the iris will be described in detail below with reference to FIG. 25.

The controller 140 may further select an image suitable for iris recognition from among the images that were determined to be unsuitable for iris recognition and were discarded, by further considering information that may be acquired in the iris segmentation process. In other words, the controller 140 may perform an additional check, based on the information that may be obtained in the iris segmentation process, on images that were discarded and determined to be unsuitable for iris recognition among the plurality of images, and may determine an image which had not passed the check as being unsuitable for iris recognition.

The information that may be acquired in an iris segmentation process may include at least one of information on the iris contrast, information on a pupillary dilatation ratio, and information on the distance between the pupil and the iris. If the controller 140 determines that the current image is unsuitable for iris recognition, the controller 140 may transmit a feedback signal to at least one of the user and a hardware component.

The information about the iris contrast may be determined by a brightness deviation near the boundary between the sclera and the iris. The controller 140 may determine that the current image is unsuitable for iris recognition and discard the current image if the determined iris contrast of the current image is smaller than a predetermined threshold value.

The information about the pupillary dilatation ratio is a numerical representation of a ratio of pupillary dilatation to illumination. The information about the pupillary dilatation ratio may be determined by dividing the pupil radius by the iris radius. The controller 140 may determine that the current image is unsuitable for iris recognition and discard the current image if the determined pupillary dilatation ratio of the current image is larger than a threshold value. This is because if the estimated pupillary dilatation ratio of the currently checked image is greater than the threshold value, it indicates that the iris area is substantially reduced due to pupillary dilatation.

The information about the distance between the pupil and the iris may be determined as a distance between the pupil center and the iris center. If the distance between the estimated pupil and iris of the current image is larger than a threshold value, the controller 140 may determine that the current image is unsuitable for iris recognition and discard the current image. If the distance between the estimated pupil and iris of the current image is larger than the threshold value, the distance indicates that the eccentricity is large, and therefore, it is impossible to perform a normalization operation on the current image. The normalization operation will be described later in detail with reference to FIG. 30.

The controller 140 may check quality of the acquired iris image, and may further select an image suitable for iris recognition from among the images that were determined to be unsuitable for iris recognition and were discarded. In other words, the controller 140 may check the quality of the iris image with respect to the remaining images that were determined to be unsuitable for iris recognition among the plurality of images and may determine the image which had not passed the check as being unsuitable for iris recognition.

The quality of the iris image may be determined based on at least one of information about a normalized eyelid opening distance, information about an overlapping area of the iris and the disturbing glare, information about the distance between the eye and the camera, and information about the distance between the pupil and a pupil glare.

The information about the normalized eyelid opening distance may be determined by dividing the eyelid opening distance by the iris radius. The eyelid opening distance indicates how open the eye is. If the eyelid opening distance is small because the iris is not visible in a state in which the eye is not sufficiently opened, the image may be determined as an image unsuitable for iris recognition. The normalized eyelid opening distance is a relative value represented by adjusting an absolute eyelid opening distance according to facial features of different persons. The controller 140 may determine that the current image is unsuitable for iris recognition and discard the current image if the normalized eyelid opening distance of the current image is smaller than a threshold value.

The information about the overlapping area of the iris and disturbing glare may be determined by an area of an overlapping area between the disturbing glare and the iris. The overlapping area of the iris and the disturbing glare may be determined as areas where the iris and one or more respective light shapes intersect. If an area of at least one of areas where it is determined that one or more light shapes of the current image intersect is greater than a predetermined threshold value, the controller 140 may determine that the current image is not suitable for iris recognition and discard the current image. If an overlapping area of the disturbing glare and an iris of a currently checked image is larger than a threshold value, an iris comparison accuracy may be lowered because an important part of the iris image may be obscured by the disturbing glare.

The information about the distance between the pupil and the pupil glare may be determined by the distance between the pupil center and a center of the pupil glare. If the distance between the pupil of the current image and the pupil glare is greater than a threshold value, the controller 140 may determine that the current image is unsuitable for iris recognition and discard the current image. The distance between the pupil and the pupil glare may indicate a relative distance considering a size of the iris. For example, the distance between the pupil and the pupil glare may be a relative value that is an absolute distance between the pupil center and the center of the pupil glare divided by an iris radius. If a distance between the estimated pupil of the current image and the pupil glare is larger than a threshold value, since the distance indicates that eccentricity is large, it is difficult to perform the normalization operation on the current image.

The information on the distance between the eyes and the camera may be determined based on an average statistical radius Rstat of a camera parameter and the human iris. If the distance between the eyes of the current image and the camera is not within a predetermined range, the controller 140 may determine that the current image is unsuitable for iris recognition and discard the current image. This is because an image having an estimated distance between the eyes and the camera is too long or too short is unsuitable for iris recognition.

Figure 30:
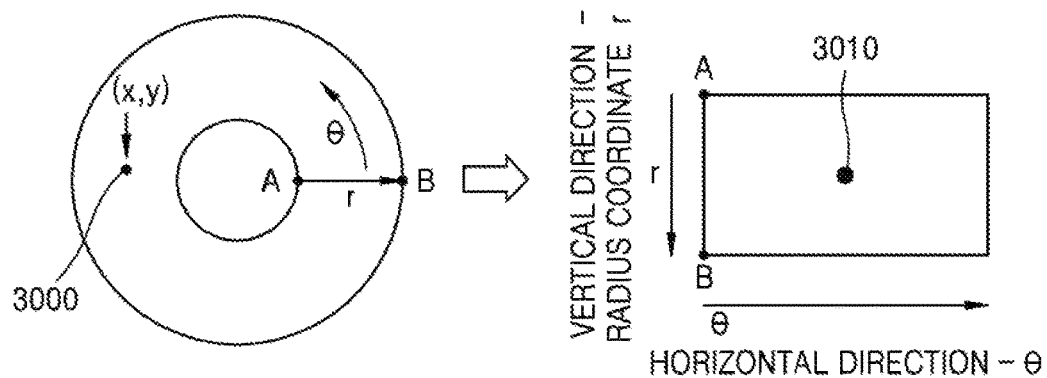
FIG. 30 illustrates a method of normalizing an iris image according to an embodiment of the present disclosure.

The controller 140 may normalize the iris image and generate a mask for the normalized iris image. Normalization may be defined as transforming pixels of an iris image from polar coordinates to linear coordinates. A normalization procedure is shown in FIG. 30. The pixels of the iris image may be transformed from circular locations into a rectangular matrix of the pixels through normalization. The mask may display specific points of the normalized iris image obscured by eyelids, eyelashes, glare, and the like. Masked points may not be used for iris matching.

The controller 140 may determine an effective area ratio. The effective area ratio may be determined by an area occupied by a portion not covered by eyelids, eyelashes, glare, etc. in the entire area of an iris area. If the effective area ratio of the current image is smaller than a threshold value, the controller 140 may determine that the current image is unsuitable for iris recognition and may discard the current image. A small effective area ratio indicates that an unmasked area is not large enough to perform reliable matching of the current image and a reference image.

The controller 140 may extract features from the normalized iris image. A feature extraction method may include, but not limited to, any one of Gabor filtering, local binary pattern (LBP) transformation, Fourier transformation, and wavelet transformation. The controller 140 may acquire a bit-shaped iris code and a mask by encoding the normalized iris image and the mask having the extracted features. An encoding method may include, but not limited to, any one of a filter based on Fourier transform, a filter based on wavelet transform, and a LBP. The bit-shaped iris code and the mask may be finally matched with a reference iris code previously stored by a legitimate user.

Figure 3:
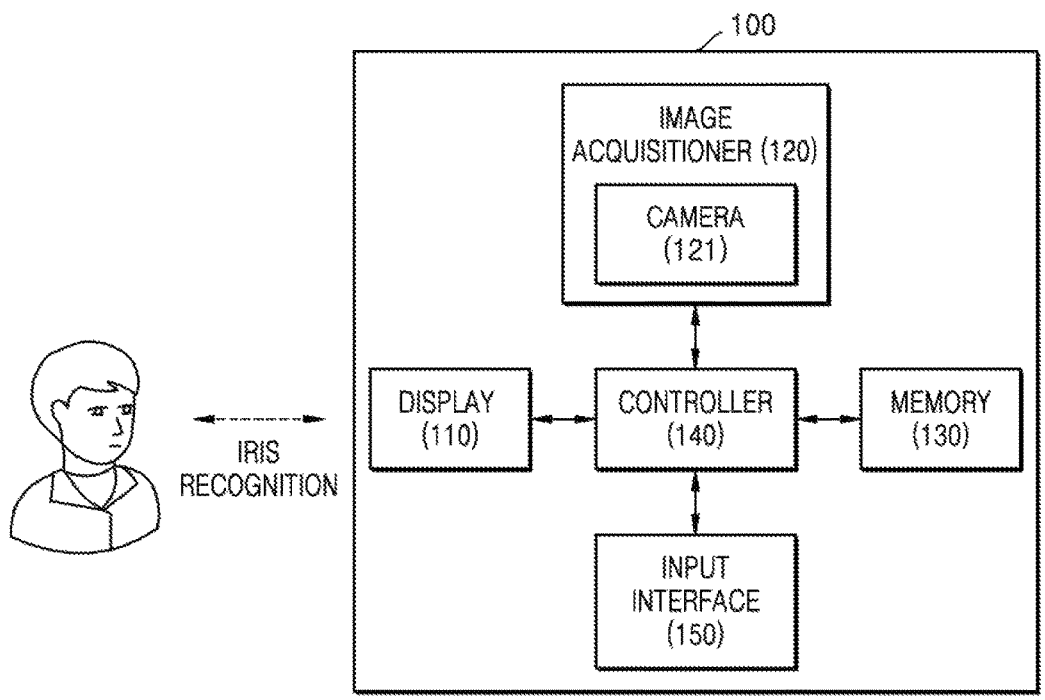
FIG. 3 shows a block diagram of an iris recognition apparatus according to an embodiment of the present disclosure.

FIG. 3 shows a block diagram of an iris recognition apparatus according to an embodiment of the present disclosure.

The iris recognition apparatus 100 of FIG. 3 is an embodiment of the iris recognition apparatus 100 of FIG. 1. Therefore, the description provided with respect to the iris recognition apparatus 100 of FIG. 1 may be applied to the iris recognition apparatus 100 of FIG. 3, although omitted below.

The iris recognition apparatus 100 may further include a display 110, a memory 130, and an input interface 150. The image acquisitioner 120 may include a camera 121.

The display 110 may display information to a user. The display 110 may display a user interface for image photographing or capture, an image, a result of iris matching, and all necessary information. In an embodiment, the display 110 may be touch-sensitive.

The camera 121 may photograph an image. The camera 121 may be equipped with infrared illumination. The camera 121 may have a light source other than infrared rays. The camera 121 may perform image capturing by an instruction of the controller 140. The camera 121 may use any type of light source for image capture.

The controller 140 may control the camera 121 to acquire an image sequence and process an image to store processed information in the memory 130.

The memory 130 may store information. The memory 130 may store an acquired image, a processed image, and additional information (e.g., an iris code, a mask, a reference iris code, etc.) for the image.

A user may previously generate the reference iris code using the iris recognition apparatus 100. The user may use the camera 121 to capture his/her face image. The controller 140 may extract an eye image from a face image, recognize the iris from the extracted eye image, and store the recognized iris in the memory 130. An iris image stored in the memory 130 may be used in a subsequent iris matching process.

The input interface 150 may be used by the user to control the iris recognition apparatus 100. The input interface 150 may include a keyboard. The keyboard may be used to control an image capture process. The keyboard is not limited to a physical keyboard and may be a virtual keyboard that appears on a touch-sensitive display.

The iris recognition apparatus 100 of FIG. 3 is only an example of an apparatus for performing iris recognition, and thus the iris recognition apparatus 100 may include, in addition to or instead of the components 110, 120, 130, 140, and 150 described above, may include other hardware, software, and firmware components.

Figure 4:
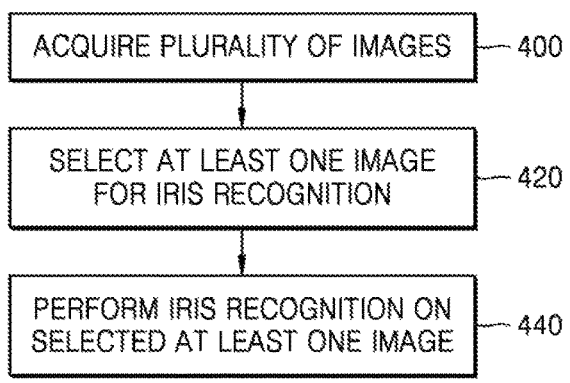
FIG. 4 shows a flowchart of an iris recognition method according to an embodiment of the present disclosure.

FIG. 4 shows a flowchart of an iris recognition method according to an embodiment of the present disclosure.

In operation 400, the iris recognition apparatus 100 may acquire a plurality of images. The iris recognition apparatus 100 may receive an image sequence including the plurality of images from a camera. The camera includes, but not limited to, an internal camera, an external camera, a front camera, a camera with IR illumination, or a combination thereof.

In operation 420, the iris recognition apparatus 100 may select at least one image suitable for iris recognition from the plurality of images. The iris recognition apparatus 100 may select one or more images suitable for iris recognition from the plurality of images based on a predetermined quality criterion. The predetermined quality criterion for selecting an image suitable for iris recognition may include pupil information. The pupil information may include at least one of information on a pupil radius and information on a pupil contrast.

The iris recognition apparatus 100 may detect eye images for iris recognition from the plurality of images and apply a predetermined quality criterion to the detected eye images. The eye image may refer to a partial image including an eye area included in an image.

The iris recognition apparatus 100 may discard an image that is determined to be unsuitable for iris recognition. For example, the iris recognition apparatus 100 may discard the image that is determined to be unsuitable for iris recognition among the plurality of images and may select a remaining image as an image suitable for iris recognition.

The iris recognition apparatus 100 may select N images to be used for iris recognition. N is a positive integer and represents a predetermined number of images selected to perform additional operations required for iris recognition. N may be determined to be less than the total number of the plurality of images in the image sequence. The iris recognition apparatus 100 may acquire an image set composed of the N images having the best quality suitable for iris recognition.

The iris recognition apparatus 100 may further consider various image attribute information in addition to pupil information to discard the image unsuitable for iris recognition among the plurality of images. The image attribute information may include at least one of information on a position of an eye area, a contrast of the eye area, brightness of the eye area, an eyelid opening distance, information about a disturbing glare, and information about the pupil and the disturbing glare. The information about the disturbing glare may include information about an area of the disturbing glare area and information about a center of the disturbing glare area.

The iris recognition apparatus 100 may discard the image unsuitable for iris recognition from the plurality of images and, and when the number of remaining images is larger than a predetermined number of images, may additional select a predetermined number of images that are to be used for iris recognition based on an image quality value.

The iris recognition apparatus 100 may transmit a feedback signal to the user based on a reason for determining that the image is unsuitable for iris recognition. The iris recognition apparatus 100 may output a message that induces the user to adjust a state of the eye. The iris recognition apparatus 100 may transmit a feedback signal to a hardware component based on the reason for determining that the image is unsuitable for iris recognition. The iris recognition apparatus 100 may transfer all the necessary information that may improve the quality of the image to be acquired to the hardware component.

Operation 420 may include subordinate operations of checking iris recognition suitability for each of the plurality of images based on one or more different criteria. Operation 440 may be performed by at least one image (a predetermined number of images collected to have the best image quality value from images that have passed all checks successfully in operation 420) selected in operation 420. The iris recognition apparatus 100 may check iris recognition suitability on each of the plurality of images based on one or more different criteria and may discard an image that has not passed even one check.

A detailed operation of operation 420 will be described in detail below with reference to a flowchart of FIG. 8 in which the subordinate operations of operation 420 are shown.

In operation 440, iris recognition may be performed on the at least one image selected in operation 420.

The iris recognition apparatus 100 may acquire an iris image for each of the images input from operation 420. The iris recognition apparatus 100 may perform iris segmentation to acquire the iris image. The iris segmentation may be performed using an image segmentation algorithm The iris segmentation may include a process of determining a boundary between the pupil and the iris and between the sclera and the iris. When the iris segmentation is completed, the center and radius of the iris may also be determined.

The iris recognition apparatus 100 may additionally select an image suitable for iris recognition from among remaining images discarded after being determined to be unsuitable for iris recognition based on at least one of information about an iris contrast, information about a pupillary dilatation ratio, and information about a distance between a pupil and an iris, which are obtainable in an iris segmentation process. In other words, the iris recognition apparatus 100 may additionally check the remaining images discarded after being determined to be unsuitable for iris recognition among the plurality of images based on at least one of the information on the iris contrast, the information about the pupillary dilatation ratio, and the information on the distance between the pupil and the iris and may determine an image that has not passed a check to be unsuitable for iris recognition. The iris recognition apparatus 100 may transmit a feedback signal to at least one of the user and a hardware component when determining that a current image is unsuitable for iris recognition.

The iris recognition apparatus 100 may check the quality of the acquired iris image and may further select an image suitable for iris recognition from the remaining images discarded after being determined to be unsuitable for iris recognition. In other words, the iris recognition apparatus 100 may check the quality of the acquired iris image with regard to the remaining images discarded after being determined to be unsuitable for iris recognition among the plurality of images s and may determine an image that has not passed a check to be unsuitable for iris recognition. The quality of the iris image may be determined based on at least one of information about the distance between the eye and the camera, information about a normalized eyelid opening distance, information about an overlapping area of the iris and a disturbing glare. and information about the distance between the pupil and the pupil glare.

The iris recognition apparatus 100 may normalize the iris image and generate a mask for the normalized iris image. Normalization may be defined as transforming pixels of an iris image from polar coordinates to linear coordinates. The pixels of the iris image may be transformed from circular locations into a rectangular matrix of the pixels through normalization. The mask may display specific points of the normalized iris image obscured by eyelids, eyelashes, glare, and the like. Masked points are not used for iris matching.

The iris recognition apparatus 100 may extract features from the normalized iris image. A feature extraction method may include, but not limited to, any one of Gabor filtering, LBP transformation, Fourier transformation, and wavelet transformation. The iris recognition apparatus 100 may acquire a bit-shaped iris code and a mask by encoding the mask and the normalized iris image having the extracted features. An encoding method may include, but not limited to, any one of a filter based on Fourier transform, a filter based on wavelet transform, or a LBP. The bit-shaped iris code and the mask may be finally matched with a reference iris code previously stored by a legitimate user.

A detailed operation of operation 440 will be described in detail below with reference to FIG. 21 where subordinate operations of operation 440 are shown.

Because operation 440 is performed only for the N images selected in operation 420, resources required for image processing may be saved. That is, in operation 420, since the best quality images suitable for iris recognition are selected, the iris recognition accuracy may be increased, power consumption and calculation complexity may be reduced, and a user experience may be improved.

Also, as described above, the image processing algorithm may be applied to the entire image only when detecting the eye image from the entire image in operation 420, and the image processing algorithm in all subsequent processes may be applied only to the eye image, not the entire image. Thus, the iris recognition method may be effective in memory consumption when implemented on a mobile device.

Figure 8:
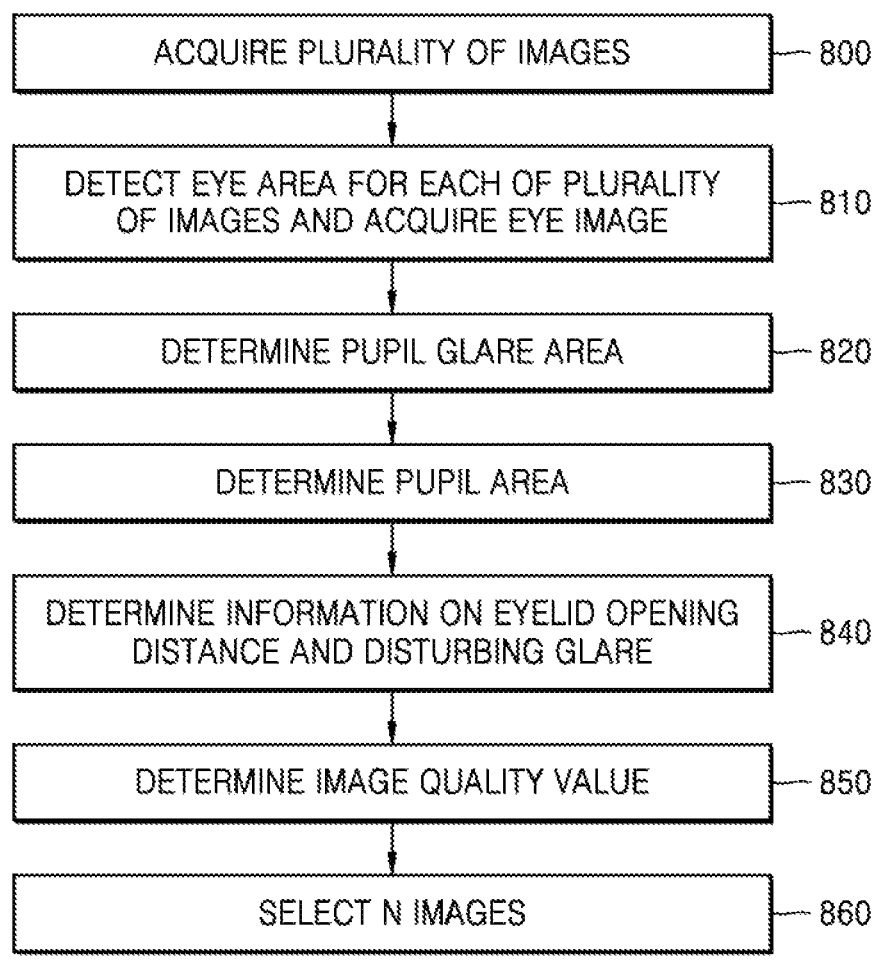
FIG. 8 shows a flowchart of a method of selecting at least one image suitable for iris recognition from a plurality of images according to an embodiment of the present disclosure.

FIG. 8 shows a flowchart of a method for selecting at least one image suitable for iris recognition from a plurality of images according to an embodiment of the present disclosure.

Referring to FIG. 8, operation 420 may be implemented to include subordinate operations 810, 820, 830, 840, 850, and 860.

Hereinafter, subordinate operations shown in the flowcharts are not essential operations of upper operations throughout the specification. The order of the subordinate operations may be arbitrarily changed, and one or more subordinate operations of the illustrated subordinate operations may be omitted from the upper operations or any subordinate operations other than the illustrated subordinate operations may be added to the upper operations.

Operation 800 corresponds to operation 400 of FIG. 4, and thus a description thereof will be omitted.

In operation 810, the iris recognition apparatus 100 may detect an eye area for each of a plurality of images.

Figure 9:
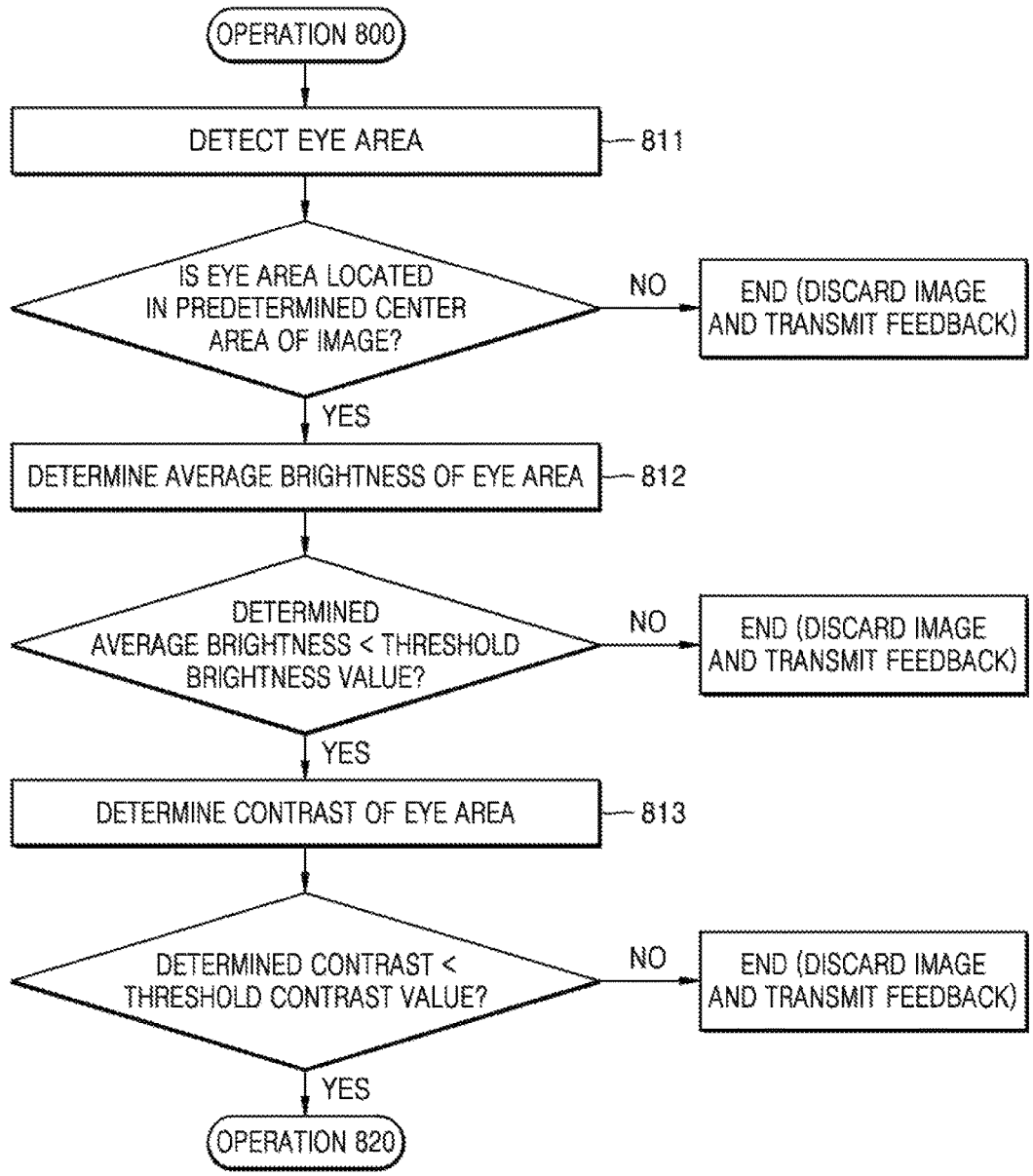
FIG. 9 is a flowchart of a method of detecting an eye area according to an embodiment of the present disclosure.

FIG. 9 is a flowchart of a method of detecting an eye area according to an embodiment of the present disclosure.

Referring to FIG. 9, the method illustrated may implement operation 810 in FIG. 8 and may be implemented to include subordinate operations 811, 812, and 813.

In operation 811, the iris recognition apparatus 100 may detect, for each of the plurality of images, an area in which eyes are located in the entire image area, and may determine whether the area in which the eyes are located is a predetermined center area of the entire image area. In operation 811, the iris recognition apparatus 100 may recognize an area of an eye in the image and recognize an object around the area of the eye. Detection of the area of the eye may use any sort of classification algorithm trained for human facial elements (nose, chin, and eye). For example, the iris recognition apparatus 100 may detect the eye area by using at least one of a direct use of a template of facial elements, Haar wavelet (a specific template for area detection), convolutional neural networks, and a calculation algorithm for classification with parameters pre-trained in experimental data. The area recognized by the eye may be bounded by a polygon (e.g., a rectangle).

Referring to FIG. 5, the areas 500 and 540 illustrate examples of eye areas bounded by different polygons. The rectangular area 500 may be described by at least two vertices (e.g., by vertices positioned with two diagonals). Since a peripheral area, which is not the center of the image, may be affected by optical distortion, if the recognized eye area is located entirely or partially outside a predetermined center area, an iris recognition suitability check may be considered to be a failure.

Figure 6:
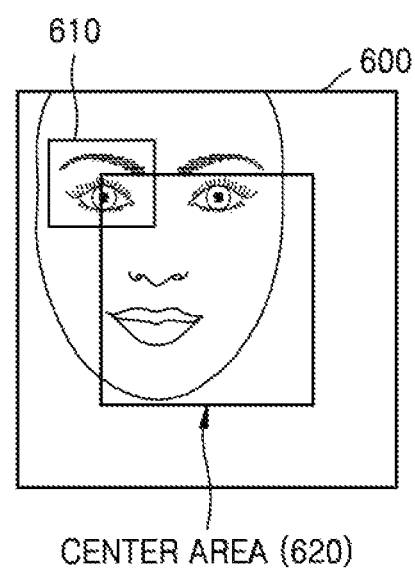
FIG. 6 shows an eye area that deviates from a central area according to an embodiment of the present disclosure.

FIG. 6 shows an eye area that deviates from a central area according to an embodiment of the present disclosure.

Referring to FIG. 6, an eye area 610 in which the eye is located is largely deviated from a central area 620 in an entire image 600 of an acquired sequence. The central area 620 of the image may be defined as a bounding shape (e.g., a rectangle described by at least two vertices). The iris recognition apparatus 100 may cut the eye area in the entire image and may determine an image including the cut eye area as an eye image.

The iris recognition apparatus 100 may compare at least two vertices defining the recognized eye area with at least two corresponding vertices defining a predetermined central area in order to check whether or not an eye area of a current image is located in the predetermined center area of the entire image. Each vertex may be defined by coordinates. Thus, in operation 811, a check of whether or not the eye area is located in the predetermined center area of the entire image may be made by determining whether or not coordinates of two or more vertices defining the recognized eye area are within an interval defined by coordinates of the predetermined center area. Alternatively, in the case where the recognized eye area and the predetermined center area are represented by rectangles, if the coordinate of at least one of the vertices defining the recognized eye area is beyond an area defined by the coordinates of the predetermined center area, the iris recognition apparatus 100 may determine that the current image is an image unsuitable for iris recognition, discard the current image, and trigger a feedback signal to at least one of a user and a hardware component.

The iris recognition apparatus 100 may perform all the following operations and subordinate operations on the detected eye image other than the entire area of each image.

Referring back to FIG. 9, in operation 812, the iris recognition apparatus 100 may determine brightness of the recognized eye area. If average brightness of the eye area of the current image is greater than predetermined threshold brightness, the iris recognition apparatus 100 may determine that the current image is an image unsuitable for iris recognition, discard the current image, and trigger the feedback signal to at least one of the user and the hardware component. Reference numeral 710 of FIG. 7 denotes an over-illuminated eye image.

In operation 813, the iris recognition apparatus 100 may determine contrast of the recognized eye area. For example, the contrast of the eye area may be determined as a standard deviation of the average brightness of the eye area. Reference numeral 730 of FIG. 7 denotes an image of poor contrast. The iris recognition apparatus 100 may determine that the current image is not suitable for iris recognition if the contrast of the current image is not sufficiently large. If the contrast of the eye area of the current image is smaller than predetermined contrast, the iris recognition apparatus 100 according to the embodiment may determine that the current image is an image unsuitable for iris recognition, discard the current image and trigger a feedback signal to at least one of the user and the hardware component.

In operation 820, the iris recognition apparatus 100 may determine a pupil glare area in the image. The determined pupil glare area may be a basis for determining the pupil area of the image.

Figure 10:
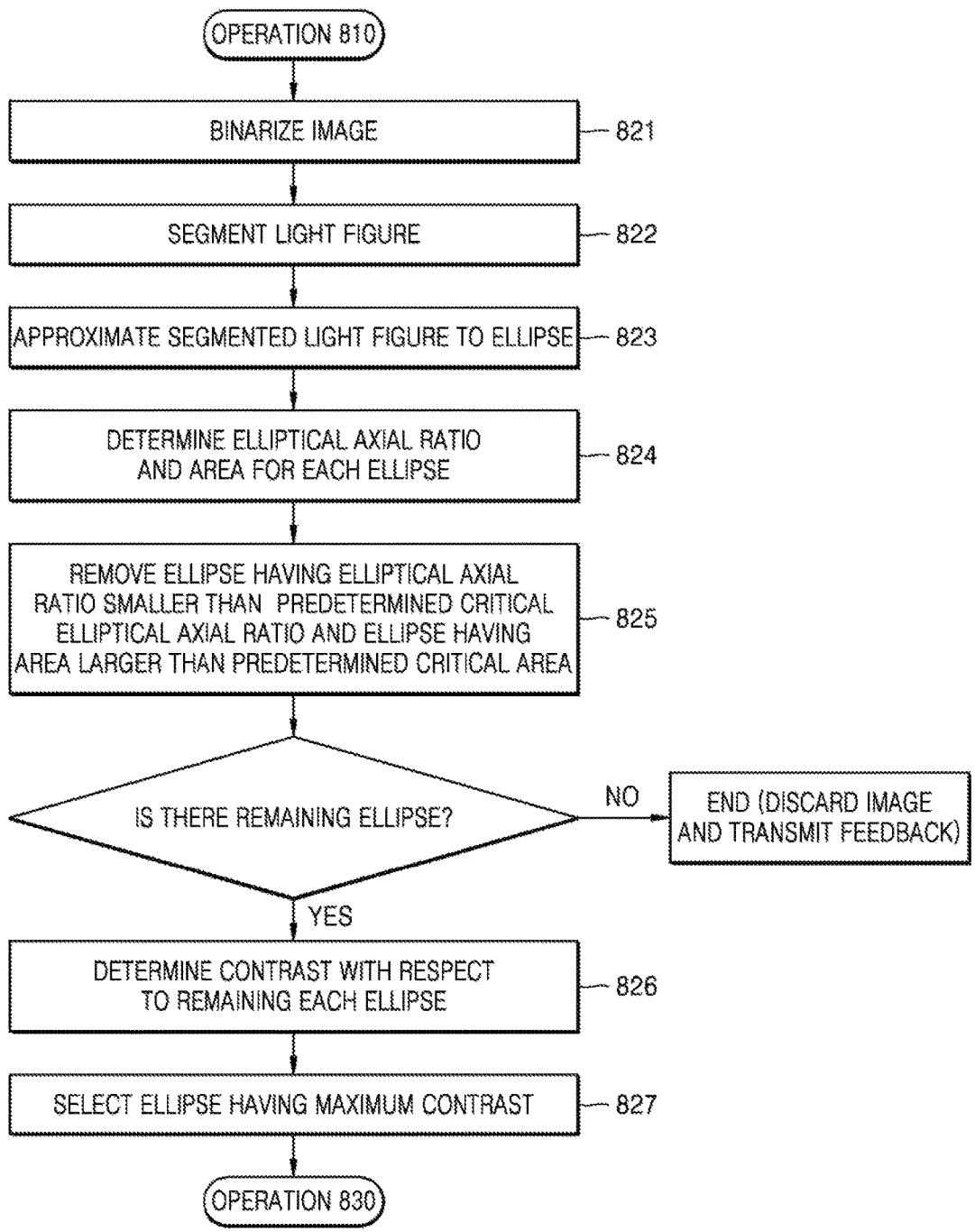
FIG. 10 is a flowchart illustrating a method of detecting a pupil glare area according to an embodiment of the present disclosure.

FIG. 10 is a flowchart illustrating a method of detecting a pupil glare area according to an embodiment of the present disclosure.

Referring to FIG. 10, operation 820 may be implemented to include subordinate operations 821, 822, 823, 824, 825, 826, and 827. In one example, to find the pupil glare in the image, one or more candidate areas may be determined to be near a center in the image. The candidate areas may be acquired by performing image binarization and generating a binary image. The generated binary image may include one or more light figures on a dark background.

In operation 821, the iris recognition apparatus 100 may binarize the image acquired in operation 810. A threshold used for binarization may be selected, for example, as the average brightness of the image. The iris recognition apparatus 100 may binarize the image using intermediate brightness, weighted average brightness, maximum brightness, and average brightness of the minimum brightness in addition to the average brightness.

In operation 822, the iris recognition apparatus 100 may segment the light figure in the image. An image may include at least one light figure (i.e., region), such as a pupil glare due to IR illumination used in a camera to acquire an image sequence and a different kind of glare.

In operation 823, the iris recognition apparatus 100 may approximate the segmented light figure to an ellipse. The iris recognition apparatus 100 may generate the ellipse for approximating the segmented light figure. The iris recognition apparatus 100 may generate a rectangle or a hexagon for approximating the segmented light figure.

In operation 824, the iris recognition apparatus 100 may determine an elliptical axial ratio and an area of the ellipse for each ellipse generated in operation 823. The elliptical axial ratio may be determined by dividing a minor axis length of the ellipse by a major axis length. The area of the ellipse may be calculated by any standard method known in the prior art of geometry. In operation 823, when other geometric shapes are used instead of ellipses for approximation of the light figure, a form factor may be calculated by approximating the elliptical axial ratio.

In operation 825, the iris recognition apparatus 100 may remove an ellipse having an elliptical axial ratio smaller than a predetermined critical elliptical axial ratio and an ellipse having an area larger than a predetermined critical area. If there is no remaining ellipse, the iris recognition apparatus 100 may determine that the current image is an image unsuitable for iris recognition, discard the current image, and trigger a feedback signal to at least one of the user and the hardware component. That is, when there is no ellipse remaining in the current image, the iris recognition apparatus 100 may determine that there is no candidate area that may be considered as the pupil glare and that the current image is not suitable for iris recognition.

In operation 826, the iris recognition apparatus 100 may determine contrast of the ellipse for each of one or more ellipses satisfying a predetermined criterion. For example, the contrast of the ellipse may be determined as a difference between the elliptic average brightness and the average brightness of a peripheral area.

In operation 827, the iris recognition apparatus 100 may select an ellipse having the maximum contrast and determine the selected ellipse as a pupil glare area. If a plurality of ellipses satisfying a predetermined criterion remain, the iris recognition apparatus 100 may determine an ellipse having the largest contrast as the pupil glare area. Since the pupil is darker than the iris, a brightness difference near the pupil or a pupil glare boundary is larger than a brightness difference of other areas. Thus, the pupil glare may be determined as a glare having the greatest contrast.

Figure 11:
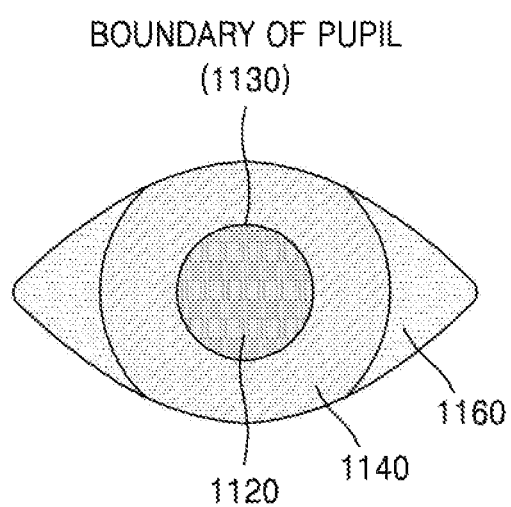
FIG. 11 shows a pupil area, an iris area, and a sclera area according to an embodiment of the present disclosure.

FIG. 11 shows a pupil area, an iris area, and a sclera area according to an embodiment of the present disclosure.

Referring to FIG. 11, the shade in the illustration represents brightness of an area in a pupil area 1120, an iris area 1140, and a sclera area 1160. The pupil contrast defined by a brightness difference near a pupil boundary 1130 may have the largest value compared to contrast of other areas in the image. In addition, the iris recognition apparatus 100 may further include a subordinate operation of determining a center of a found pupil glare. Information about the center of the pupil glare may be entered in operation 830.

In operation 830, the iris recognition apparatus 100 may detect a pupil area in the image.

Figure 12:
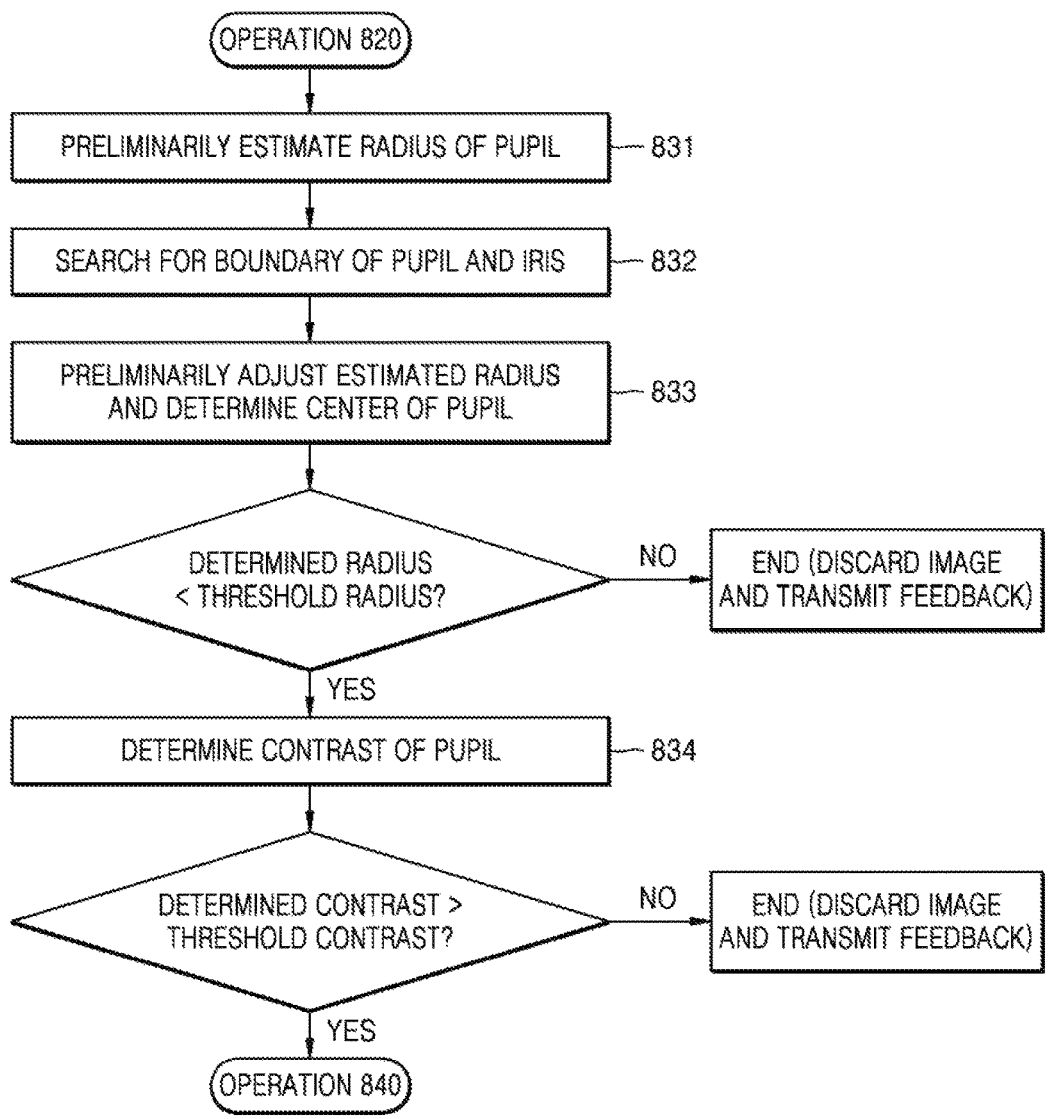
FIG. 12 is a flowchart illustrating a method of detecting a pupil area according to an embodiment of the present disclosure.

FIG. 12 is a flowchart illustrating a method of detecting a pupil area according to an embodiment of the present disclosure.

Referring to FIG. 12, operation 830 may be implemented to include subordinate operations 831, 832, 833, and 834.

In operation 831, the iris recognition apparatus 100 may preliminarily estimate a pupil radius.

Figure 13:
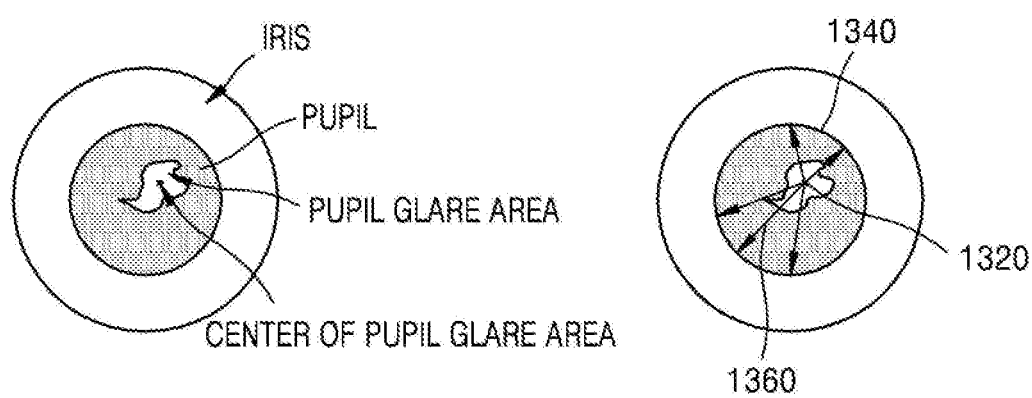
FIG. 13 shows a method of preliminarily estimating a pupil radius according to an embodiment of the present disclosure.

FIG. 13 shows a method of preliminarily estimating a pupil radius according to an embodiment of the present disclosure.

Referring to FIG. 13, an iris recognition apparatus 100 may generate a set of straight radial lines starting from a center 1320 of the pupil glare area and reaching a boundary 1340 between a pupil and an iris, and determine a length of each straight line. A boundary between the pupil and the iris may be detected by contrast between a darker area of the pupil and a lighter area of the iris. The iris recognition apparatus 100 may select a longest straight line 1360 among a plurality of straight radial lines as a preliminarily estimated pupil radius r.

Referring back to FIG. 12, in operation 832, the iris recognition apparatus 100 may search for a boundary 1130 between the pupil and the iris.

Figure 14:
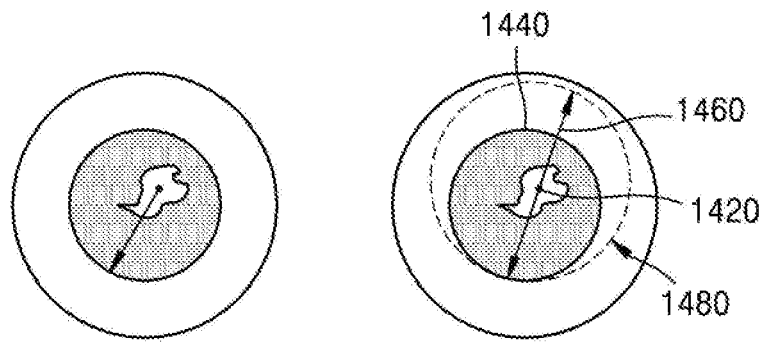
FIG. 14 shows a method of determining a boundary of a pupil and an iris according to an embodiment of the present disclosure.

FIG. 14 shows a method of determining a boundary of a pupil and an iris according to an embodiment of the present disclosure.

Referring to FIG. 14, the boundary 1130 between the pupil and the iris may be searched in an area 1480 limited by a circle having a center coinciding with a center 1420 of the pupil glare area and the radius r preliminarily estimated based on the longest straight line 1460 in operation 831. For example, the iris recognition apparatus 100 may determine the boundary 1440 between the pupil and the iris based on a difference in local brightness in the limited area 1480. The iris recognition apparatus 100 may determine the boundary 1440 between the pupil and the iris using the Canny Edge Detector within the limited area 1480. The determined boundary 1130 may be represented by a series of points.

Referring back to FIG. 12, in operation 833, the iris recognition apparatus 100 may determine final pupil center and pupil radius by adjusting the preliminarily estimated pupil radius.

Figure 15:
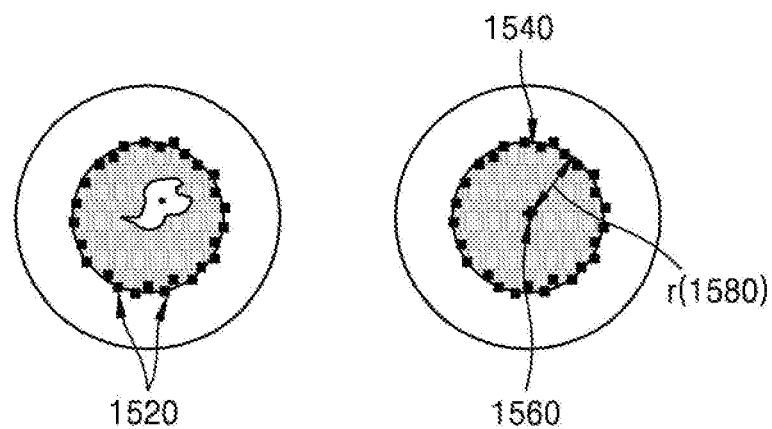
FIG. 15 shows a method of determining a pupil center and a pupil radius according to an embodiment of the present disclosure.

FIG. 15 shows a method of determining a pupil center and a pupil radius according to an embodiment of the present disclosure.

Referring to FIG. 15, the iris recognition apparatus 100 may approximate a circle 1540 with respect to a boundary between the pupil and the iris searched as a set of points 1520 in operation 832 to determine a center 1560 of the pupil. The approximate circle may be generated through a least squares method. The iris recognition apparatus 100 may determine an adjusted radius 1580 of the pupil to a radius of the approximate circle 1540. Finally, the iris recognition apparatus 100 may determine the circle 1540 as the pupil boundary, and acquire the pupil center 1560 and the pupil radius 1580. When the pupil radius of the current image is larger than a predetermined threshold pupil radius, the iris recognition apparatus 100 may determine that the current image is an image unsuitable for iris recognition, discard the current image, and trigger a feedback signal to at least one of the user and the hardware component.

Referring back to FIG. 12, in operation 834, the iris recognition apparatus 100 may determine contrast of the pupil. The pupil contrast may be determined based on a deviation of brightness values near the determined boundary of the pupil and the iris. Since an upper part of the boundary between the pupil and the iris may be covered by an eyelid, a bottom part of the boundary may be used to calculate the pupil contrast. Alternatively, other parts having a boundary not covered may be used for a contrast calculation.

Figure 16:
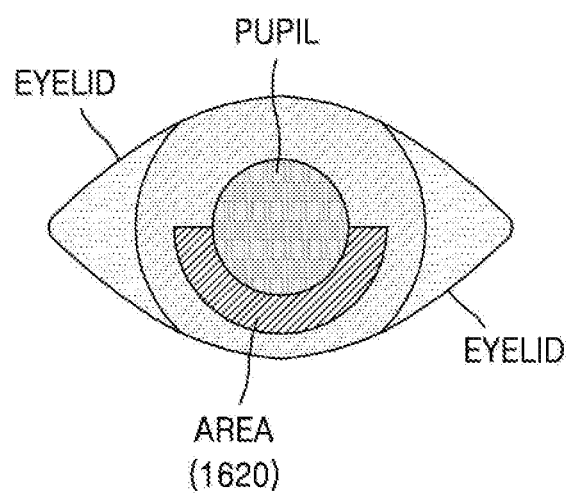
FIG. 16 shows an area for determining a pupil contrast according to an embodiment of the present disclosure.

FIG. 16 shows an area for determining a pupil contrast according to an embodiment of the present disclosure.

Referring to FIG. 16, an area 1620 may be used for contrast calculation between the pupil and the iris. If the calculated contrast of the current image is smaller than a predetermined threshold contrast, the iris recognition apparatus 100 may determine that the current image is an image unsuitable for iris recognition, discard the current image, and trigger a feedback to at least one of the user and the hardware component.

Referring back to FIG. 8, in operation 840, the iris recognition apparatus 100 may determine information on an eyelid opening distance and a disturbing glare. In operation 840, the iris recognition apparatus 100 may use the pupil radius, the pupil center Cp, and the pupil contrast determined in previous operations.

Figure 17:
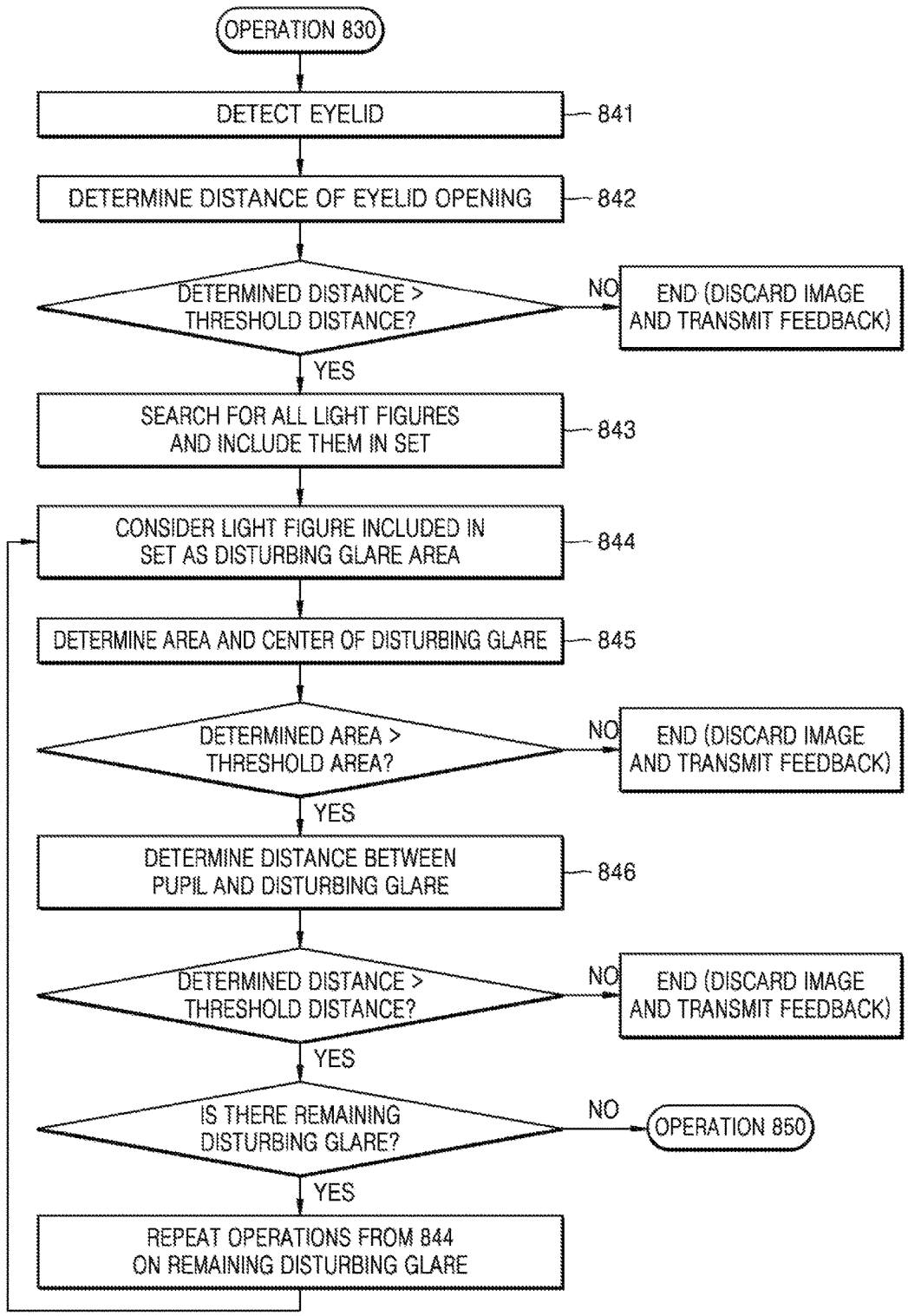
FIG. 17 is a flowchart of a method of determining an eyelid opening distance and determining information about a disturbing glare according to an embodiment of the present disclosure.

FIG. 17 is a detailed flowchart of a method of determining the eyelid opening distance and determining information about a disturbing glare according to an embodiment of the present disclosure.

Referring to FIG. 17, operation 840 in FIG. 8 may be implemented to include subordinate operations 841, 842, 843, 844, 845, and 846. Further, the disturbing glare is different from the pupil glare used as a starting point for a pupil search of operation 820 of FIG. 8.

Referring back to FIG. 8, in operation 841, the iris recognition apparatus 100 may detect an eyelid in the image. The eyelid may be detected using the contrast of the iris and the eyelid. The contrast of the iris and the eyelid may be determined in a pupil column area that is defined by a pupil width.

Figure 18:
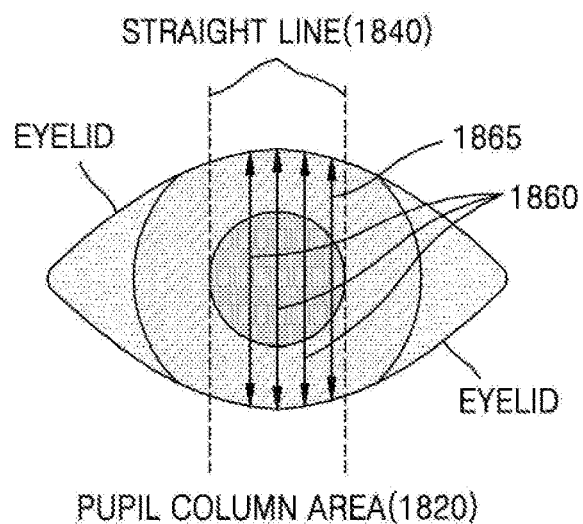
FIG. 18 shows a method of determining an eyelid opening distance according to an embodiment of the present disclosure.

FIG. 18 shows a method of determining an eyelid opening distance according to an embodiment of the present disclosure.

Referring to FIG. 18, a pupil column area 1820 is an area limited by two vertical lines 1840 in left and right sides of the pupil. The vertical lines 1840 include vertical lines away by the same distance as the pupil radius from the pupil center. A series of vertical lines 1860 may face up and down starting from any horizontal coordinate lying in the pupil column area 1820 reaching a boundary of the iris and each eyelid. The boundary of the iris and the eyelid may be detected based on a brightness difference.

Referring back to FIG. 17, in operation 842, the iris recognition apparatus 100 may determine an eyelid opening distance. The eyelid opening distance may be determined by a length of the shortest vertical line 1865 of the series of vertical lines 1860 of the defined pupil area. When the eyelid opening distance of the current image is smaller than a predetermined threshold distance, the iris recognition apparatus 100 the iris recognition apparatus 100 may determine that the current image is an image unsuitable for iris recognition, discard the current image, and trigger a feedback to at least one of the user and the hardware component. Hereinafter, the eyelid opening distance which is referred to as EODistance.

In operation 843, the iris recognition apparatus 100 may search for all light figures included in the image and include them in one set.

Operations 844 through 846 may be sequentially performed for each of the one or more light figures included in the set until operations ends since there is no remaining light figure in the set or the current image is discarded. If at least one of one or more disturbing glares included in a currently processed image fails checks of subordinate operations 844 through 846, operations 844 through 846 may end.

In operation 844, the iris recognition apparatus 100 may consider the light figure included in the set as a disturbing glare area. Hereinafter, a disturbing glare may mean a disturbing glare area in the image.

In operation 845, the iris recognition apparatus 100 may determine an area and a center of the disturbing glare. The area of the disturbing glare may be determined by counting the number of elements (e.g., number of pixels) constituting the disturbing glare area. The center of the disturbing glare may be determined as a mass center of a planar figure of the disturbing glare. Specific techniques for determining the mass center of the planar figure are well known in the art. If an area of a current disturbing glare among one or more disturbing glares of the current image is larger than a predetermined threshold area, operation 845 ends and the iris recognition apparatus 100 may determine that the current image is an image unsuitable for iris recognition, discard the current image, and trigger a feedback to at least one of the user and the hardware component.

In operation 846, the iris recognition apparatus 100 may determine a distance between the pupil and the disturbing glare. The distance between the pupil and the disturbing glare may be determined by a distance between a center of the pupil and a center of the disturbing glare. If the determined distance between the pupil and the disturbing glare is smaller than a predetermined threshold distance, operation 846 ends and the iris recognition apparatus 100 may determine that the current image is an image unsuitable for iris recognition, discard the current image, and trigger a feedback to at least one of the user and the hardware component. If the disturbing glare blocks the pupil and the iris, the iris or a part of the pupil may be blurred.

If there is no disturbing glare that has not passed checks of operations 845 and 846, the iris recognition apparatus 100 may determine an image quality value for each of the images in operation 850.

In operation 850, the iris recognition apparatus 100 may determine the image quality value for each image.

In operation 850, the iris recognition apparatus 100 may use information about the pupil radius PRadius, the pupil center PCenter, the pupil contrast PContrast, and the eyelid opening distance EODistance determined in previous operations to determine the image quality value for each image. The image quality value is a numerical value indicating the iris recognition suitability of the current image. The iris recognition apparatus 100 may determine weighting factors w1, w2, and w3 for determining the image quality value. w1 is a weighting factor of the pupillary contrast PConstrast, w2 is a weighting factor of an eyelid opening factor EOFactor, and w3 is a weighting factor of a sharpness factor SFactor.

Figure 19:
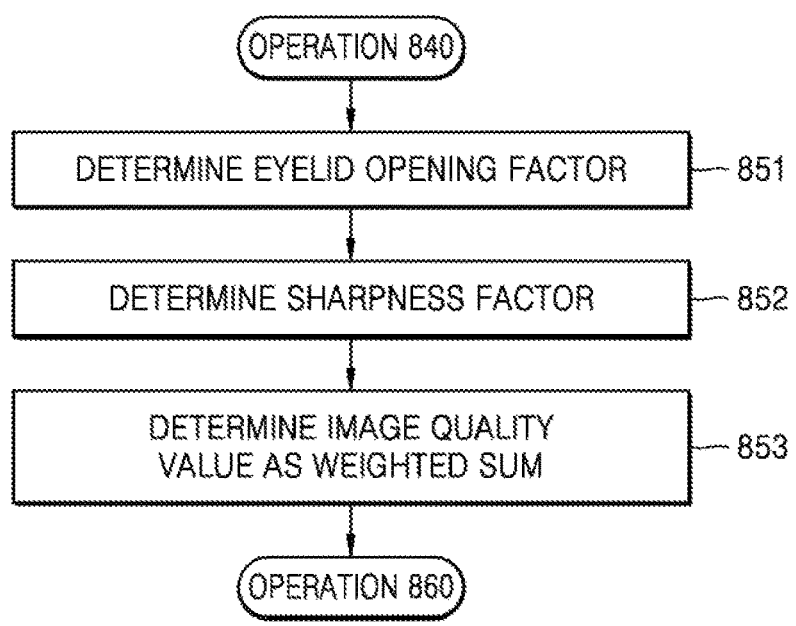
FIG. 19 is a flowchart of a method for determining an image quality value according to an embodiment of the present disclosure.

FIG. 19 is a detailed flowchart of a method for determining an image quality value according to an embodiment of the present disclosure.

Referring to FIG. 19, operation 850 may be implemented include subordinate operations 851, 852, and 853.

In operation 851, the eyelid opening factor EOFactor may be determined. For example, the eyelid opening factor may be determined as a value (EODistance/(2*PRadius)) obtained by dividing the eyelid opening distance by the pupil radius.

In operation 852, the sharpness factor SFactor may be determined. For example, the sharpness factor may be determined by a deviation of brightness in a predetermined outer area near the pupil boundary.

In operation 853, the image quality value IQValue may be determined as a weighted sum of the pupil contrast, the eyelid opening factor, and sharpness factors. For example, the image quality value IQValue may be determined as follows using Equation 1.

$$IQValue = w1*PContrast + w2*EOFactor + w3*Sfactor \quad \text{Equation 1}$$

The weighting factors w1, w2, and w3 may be determined experimentally. The weighting factors w1, w2, and w3 may initially be determined such that contribution of each component (the pupil contrast, the eyelid opening factor, and the sharpness factor) is the same. For example, if w1+w2+w3 is 1, each of w1, w2, and w3 may be determined to be ⅓.

Referring back to FIG. 8, in operation 860, the iris recognition apparatus 100 according to an embodiment may select N images suitable for iris recognition.

As described above, N is a positive integer and represents a predetermined number of images selected to perform additional operations required for iris recognition. In operation 860, the iris recognition apparatus 100 according to an embodiment may collect N images having the best quality by replacing an image having the lowest quality in the image set with an image having a better quality. The iris recognition apparatus 100 according to an embodiment may additionally select an image of a better quality value based on the image quality value IQValue to collect the N images.

Figure 20:
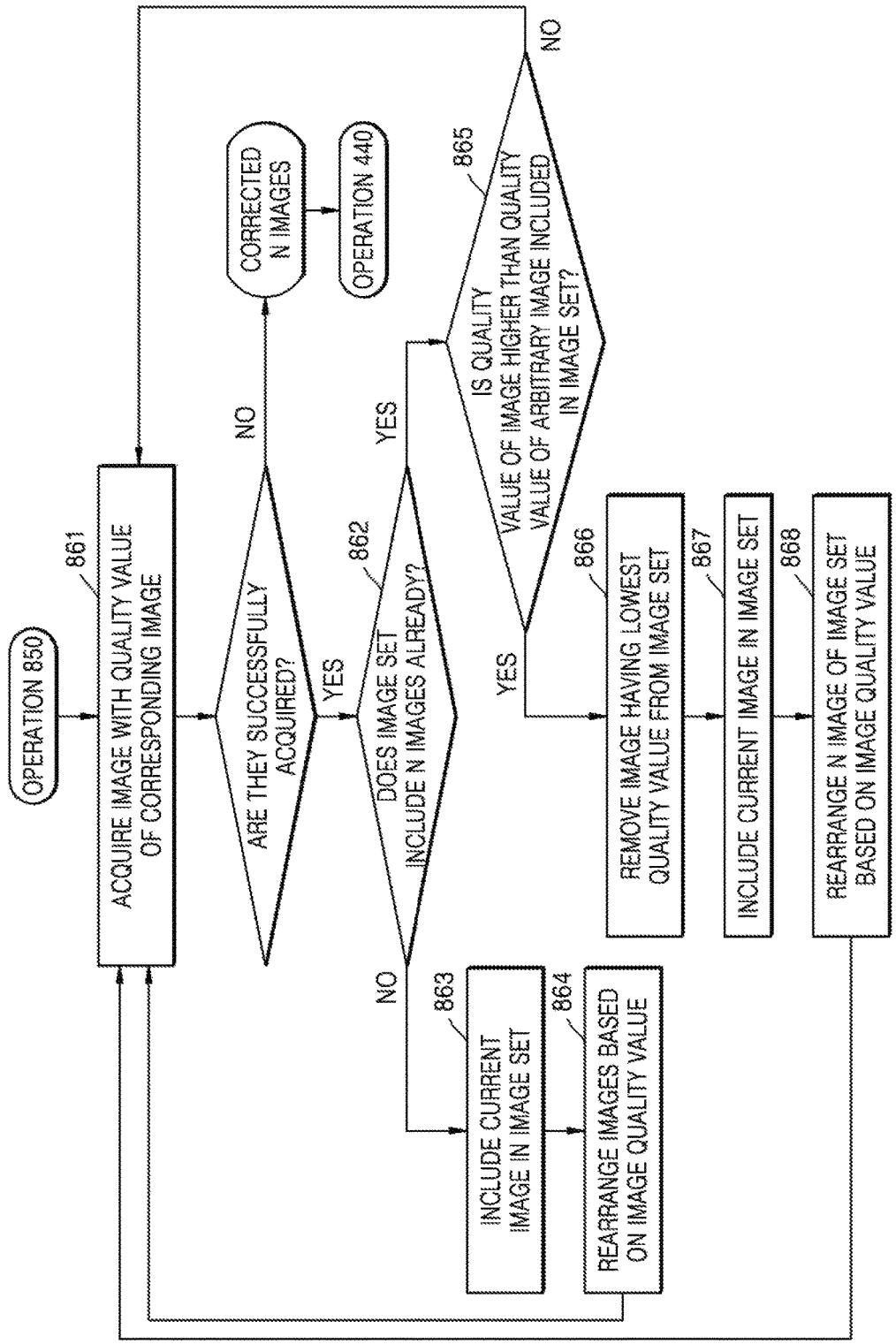
FIG. 20 is a flowchart of a method of acquiring an image set consisting of N images according to an embodiment of the present disclosure.

FIG. 20 is a flowchart of a method of acquiring an image set consisting of N images according to an embodiment of the present disclosure.

Referring to FIG. 20, operation 860 may be implemented to include subordinate operations 861, 862, 863, 864, 865, 866, 867, and 868.

In operation 861, the iris recognition apparatus 100 according to an embodiment may acquire an image together with a quality value of a corresponding image. If there is no image to be acquired, since a selection of one or more images for iris recognition from the plurality of images is complete, the selected one or more images are transferred to operation 440. The number of one or more images transferred to operation 440 may be N or less. For example, the iris recognition apparatus 100 may perform iris recognition in operation 440 if at least one image is determined to be suitable for iris recognition, even if the N images are not collected.

In operation 862, the iris recognition apparatus 100 according to an embodiment may determine whether an image set already includes the N images. If the image set includes images fewer than the N images, then in operation 863, the iris recognition apparatus 100 according to an embodiment may include a current image in the image set.

In operation 864, the iris recognition apparatus 100 may rearrange the images in the image set based on order of image quality values. For example, the iris recognition apparatus 100 may sort the images in the image set in ascending or descending order based on the image quality values. The iris recognition apparatus 100 may rearrange the images in the image set and acquire a next image with an image quality value in operation 861.

If the image set already includes the N eye images, the iris recognition apparatus 100 may compare the image quality values of the images in the image set with the image quality value of the current image in operation 865. In operation 865, the iris recognition apparatus 100 may check whether the quality value of the current image is higher than the image quality value of any image included in the set. For example, the iris recognition apparatus 100 may compare the image quality value of the current image with a lowest image quality value of the image quality values of the images included in the set. If the image quality value of the current image is higher than the lowest image quality value, the iris recognition apparatus 100, in operation 866, may remove an eye image of the lowest quality value from the set. Otherwise, at operation 861, the iris recognition apparatus 100 may acquire the next image with the corresponding image quality value.

In operation 867, the iris recognition apparatus 100 may include the current image in the image set.

In operation 868, the iris recognition apparatus 100 may rearrange the N eye images in the image set based on the image quality values. For example, the iris recognition apparatus 100 may align the N images in ascending or descending order based on the image quality values.

In summary, at least one of the plurality of images acquired in operation 800 may be discarded as being determined to be unsuitable for iris recognition, and the images successfully passed through all the checks in operations 810 to 850 may be input to operation 860 along with the image quality values. In operation 860, the iris recognition apparatus 100 may rearrange the N images in the image set by replacing the lowest quality image in the image set with the current image of a better quality.

Operation 860 may be a last subordinate operation of operation 420 of FIG. 4. In operation 860, the image set consisting of the N images of the highest quality for subsequent processing (e.g., operation 440 of FIG. 4) may be collected. The collected image set may be input to operation 440.

As described above, an operation of discarding an image that has not passed an iris suitability check may include an operation of transmitting a feedback signal. For example, in operation 820, if the iris recognition apparatus 100 fails to detect a pupil glare from the current image, the feedback signal may include a message to reacquire an image sequence using infrared light, or the like, or information (e.g., a control signal) for automatically turning on infrared illumination when acquiring a next image sequence. Further, the feedback signal may include information to acquire a next image in the acquired image sequence or information to acquire a new image sequence to a user if the image is not present in the already acquired image sequence (i.e., if all images are processed).

The N eye images selected in operation 420 and subordinate operations of operation 420 and all information (for example, a pupil center, a pupil radius, and an eyelid opening distance) determined for each of the N images may be input to operation 440 and subordinate operations of operation 440.

Figure 21:
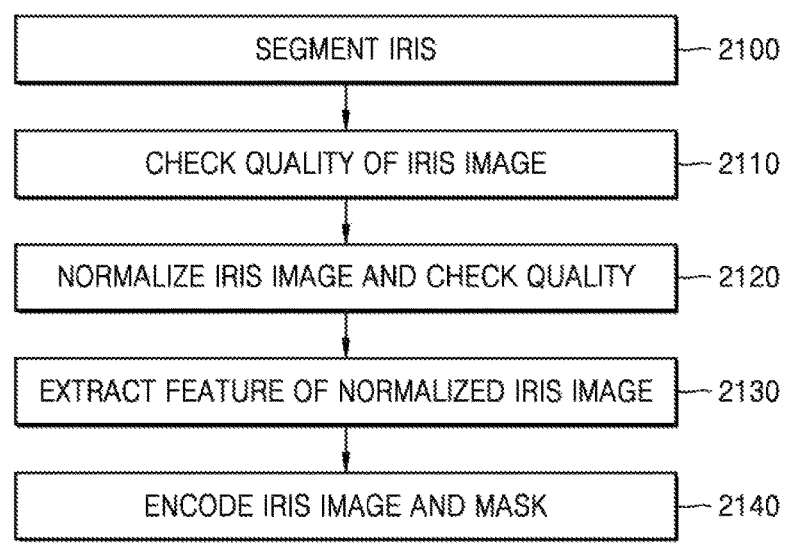
FIG. 21 illustrates a flowchart of a method of performing iris recognition on at least one selected image according to an embodiment of the present disclosure.

FIG. 21 illustrates a detailed flowchart of a method of performing iris recognition on at least one selected image according to an embodiment of the present disclosure.

Referring to FIG. 21, operation 440 may be implemented to include subordinate operations 2100, 2110, 2120, 2130, and 2140. In operation 2100, the iris recognition apparatus 100 may perform iris segmentation on the at least one selected image. The iris recognition apparatus 100 may acquire an image set composed of N images collected in operation 860 and perform iris segmentation on each of the images in the image set.

FIG. 22 illustrates iris segmentation. The iris recognition apparatus 100 may perform iris segmentation on an image 2200 to acquire an iris image 2220 according to an embodiment of the present disclosure. The iris segmentation may be performed using various image processing algorithms.

Figure 23:
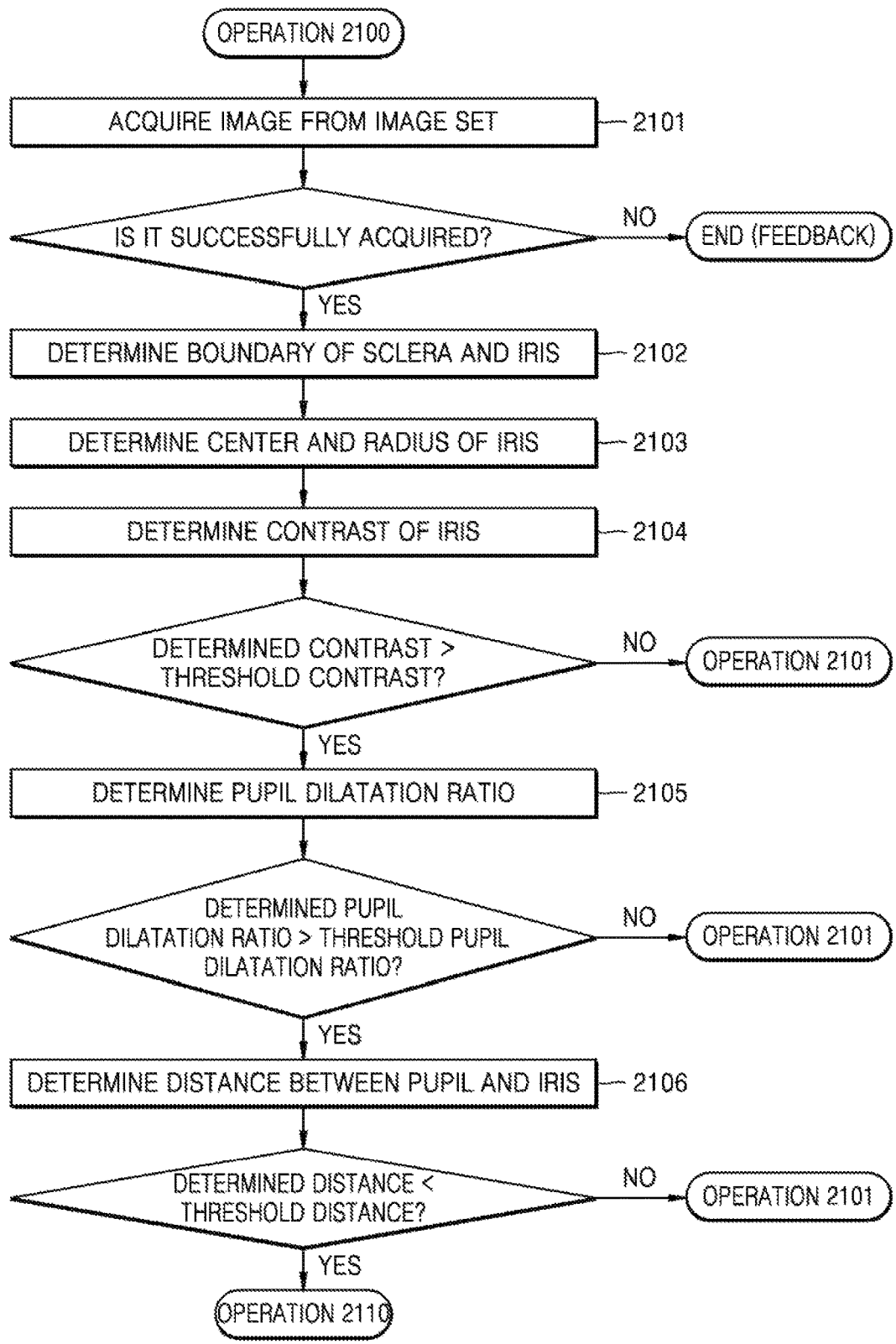
FIG. 23 is a flowchart of an iris segmentation method according to an embodiment of the present disclosure.

FIG. 23 is a detailed flowchart of an iris segmentation method according to an embodiment of the present disclosure.

Referring to FIG. 23, operation 2100 may be implemented to include subordinate operations 2101, 2102, 2103, 2104, 2105, and 2106.

In operation 2101, the iris recognition apparatus 100 may acquire an image from the image set composed of the N images. If the image is not successfully acquired, an iris recognition process may end.

In operation 2102, the iris recognition apparatus 100 may determine a boundary between the sclera and the iris. The boundary between the sclera and the iris may be determined based on local intensities.

Figure 24:
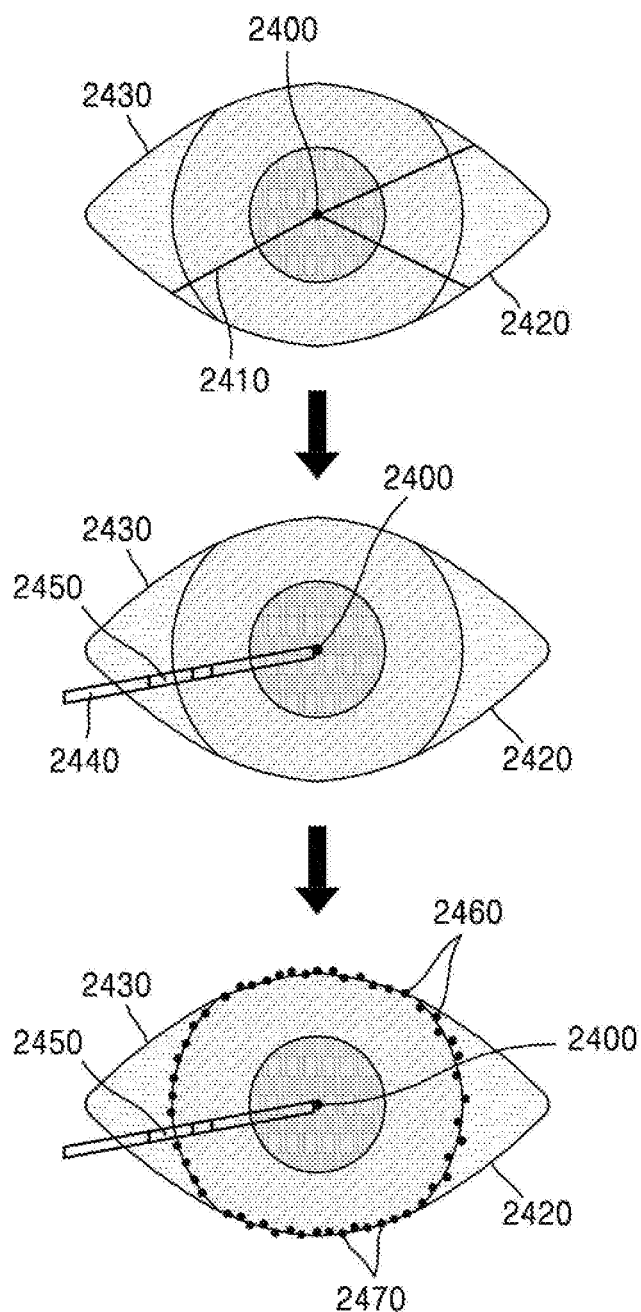
FIG. 24 shows a method of determining a boundary of a sclera and an iris according to an embodiment of the present disclosure.

FIG. 24 shows a method of determining a boundary of a sclera and an iris according to an embodiment of the present disclosure.

Referring to FIG. 24, the boundary between the sclera and the iris may be determined by creating a set of straight radial lines that start in all directions starting from a center 2400 of the pupil. Any straight line 2410 of the set of radial straight lines may be used to search for the boundary of the sclera and the iris. Average brightness in a predetermined area 2440 along the straight line 2410 may be calculated. The average brightness may be calculated in the area 2440 in an area exceeding the pupil radius r. Because the sclera is brighter than the iris, the boundary between the sclera and the iris may be found as a change 2450 from a dark area of the iris along a direction of the straight line 2410 to a bright area of the sclera. Therefore, by the average brightness difference (change), an outer boundary of the iris may be searched. The same method may be used to search for a boundary of the iris and eyelids 2420 and 2430. The iris recognition apparatus 100 may acquire a set of points 2460 describing an iris outer boundary and a set of points 2470 describing a boundary of the iris and the eyelid.

Referring back to FIG. 23, in operation 2103, the iris recognition apparatus 100 may determine the center (ICenter) and the radius (R) of the iris.

Figure 25:
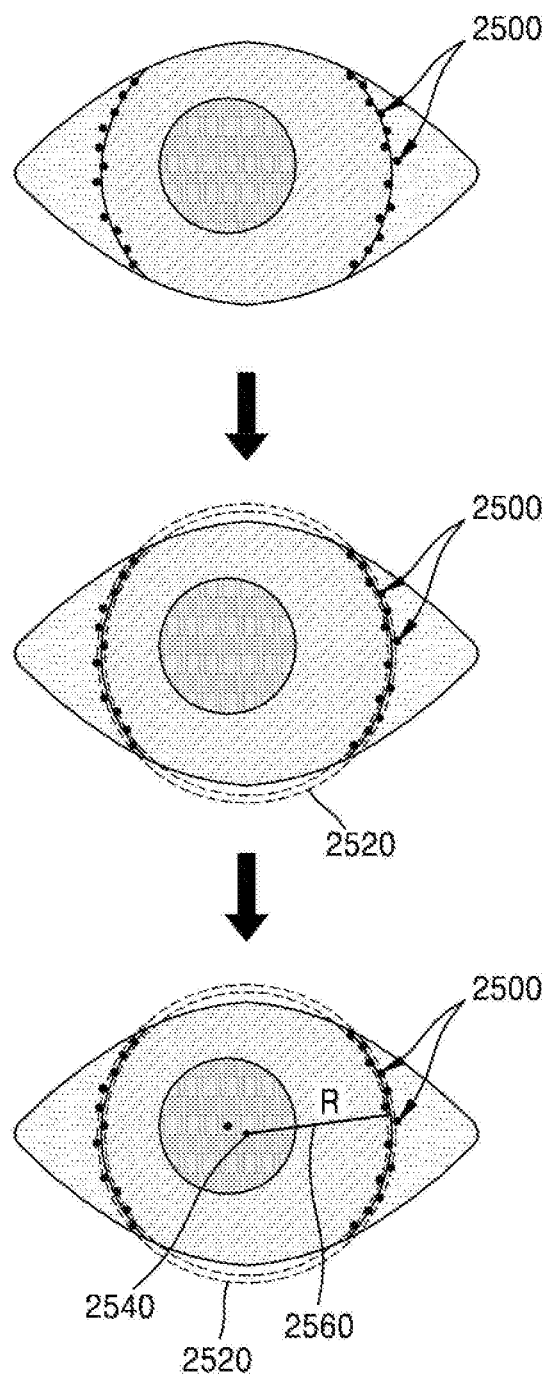
FIG. 25 shows a method of determining an iris center and an iris radius according to an embodiment of the present disclosure.

FIG. 25 shows a method of determining an iris center and an iris radius according to an embodiment of the present disclosure.

Referring to FIG. 25, to determine the iris center and radius, an approximate circle 2520 may be generated for a point set 2500 that describes the iris outer boundary. The approximate circle 2520 may be generated by applying a least squares method to the point set 2500 describing the iris outer boundary. The approximate circle 2520 may be determined as an iris area which may be described by a center 2540 and a radius 2560. An approximate circle may also be generated when the boundary between the sclera and the iris overlaps the eyelid and the boundary between the sclera and the iris is partially searched. In addition, in the case where eyes greatly affect an iris shape, an approximate ellipse may be used instead of the approximation circle.

Referring back to FIG. 23, in operation 2104, the iris recognition apparatus 100 may determine contrast of the iris. For example, the iris contrast may be determined as an average of absolute deviations near the boundary between the sclera and the iris. If the determined iris contrast of a current image is smaller than predetermined threshold contrast, the iris recognition apparatus 100 may determine that the current image is as an image unsuitable for iris recognition, discard the current image, and return to subordinate operation 2101 to acquire a next eye image from the image set, and trigger a feedback signal to at least one of the user and a hardware component.

In operation 2105, the iris recognition apparatus 100 may determine a pupil dilatation ratio (PDRatio). It is well known that a pupil widens in darkness and narrows in a bright place. The pupil expansion ratio may be determined as follows like Equation 2.

$$\text{PDRatio} = \text{PRadius}/R \text{ (PRadius denotes the pupil radius and } R \text{ denotes the iris radius)} \qquad \text{Equation 2}$$

If the determined pupil dilatation ratio of the current image is greater than a predetermined threshold ratio, the iris recognition apparatus 100 may determine that the current image is as an image unsuitable for iris recognition, discard the current image, and return to subordinate operation 2101 to acquire a next eye image from the image set, and trigger a feedback signal to at least one of the user and a hardware component. This is because an iris area of a currently processed image is substantially reduced due to pupillary dilatation, which is unsuitable for subsequent processing for iris recognition.

Figure 26:
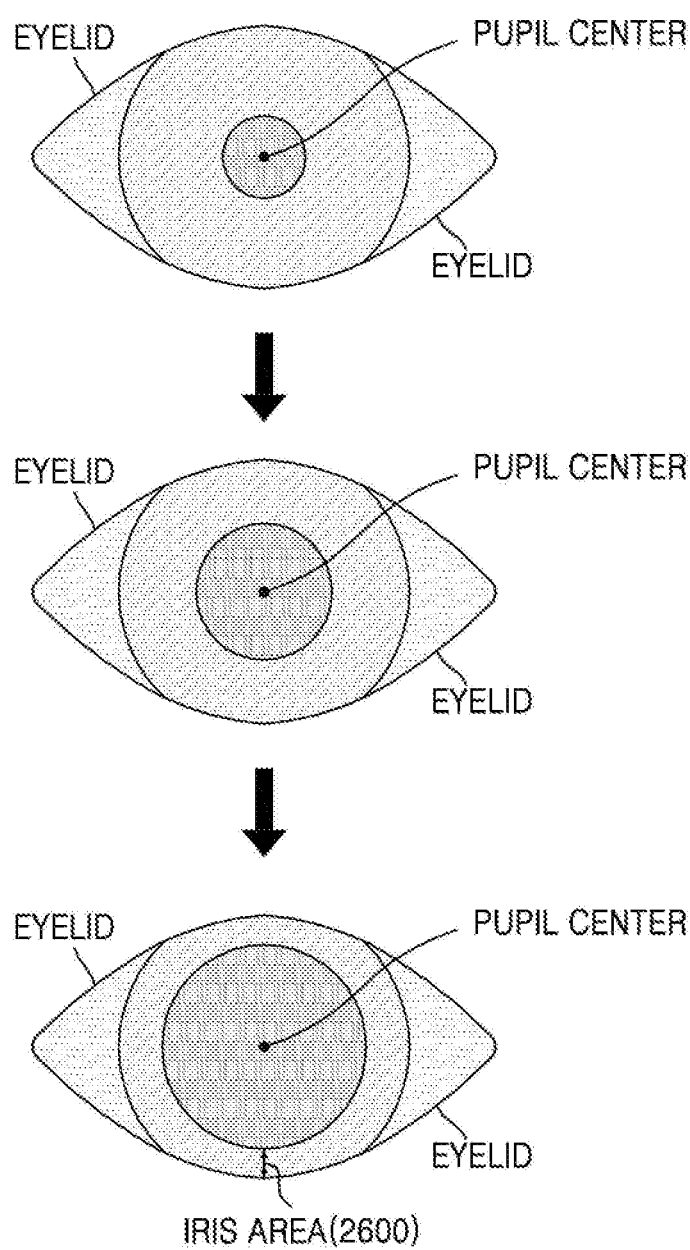
FIG. 26 shows an iris area reduced due to stepwise pupillary dilatation according to an embodiment of the present disclosure.

FIG. 26 shows an iris area reduced due to a stepwise pupillary dilatation according to an embodiment of the present disclosure.

In operation 2106, the iris recognition apparatus 100 may determine the distance PIDistance between the pupil and the iris. For example, the distance between the pupil and the iris may be determined as a distance between a pupil center and an iris center. The distance between the pupil and the iris may be calculated by Equation 3 below.

$$\text{PIDistance} = |\text{PCenter} - \text{ICenter}| \qquad \text{Equation 3}$$

An absolute distance between the pupil and the iris may be calculated as a distance between two points, each expressed as a pair of coordinates. A relative distance between pupil and iris may be calculated as PIDistance/R, where R denotes the pupil radius. If the determined relative distance between the pupil and iris of the current image is larger than a predetermined threshold distance, the iris recognition apparatus 100 according to the embodiment may determine that the current image is as an image unsuitable for iris recognition, discard the current image, and return to subordinate operation 2101 to acquire a next eye image from the image set, and trigger a feedback signal to at least one of the user and a hardware component. This is because that the determined distance between the pupil and the iris of the current image indicates that the current image is unsuitable for subsequent processing for iris recognition. A centering error (eccentricity) is that the distance between the pupil and the iris is greater than the threshold distance. Such a center error makes it impossible to perform iris image normalization operation of transforming iris polar coordinates to linear coordinates. The normalization operation may be performed by assuming that the iris center is the same as the pupil center, and the iris center is selected as an origin of a polar coordinate system.

Referring back to FIG. 21, in operation 2110, the iris recognition apparatus 100 may check quality of an iris image.

Figure 27:
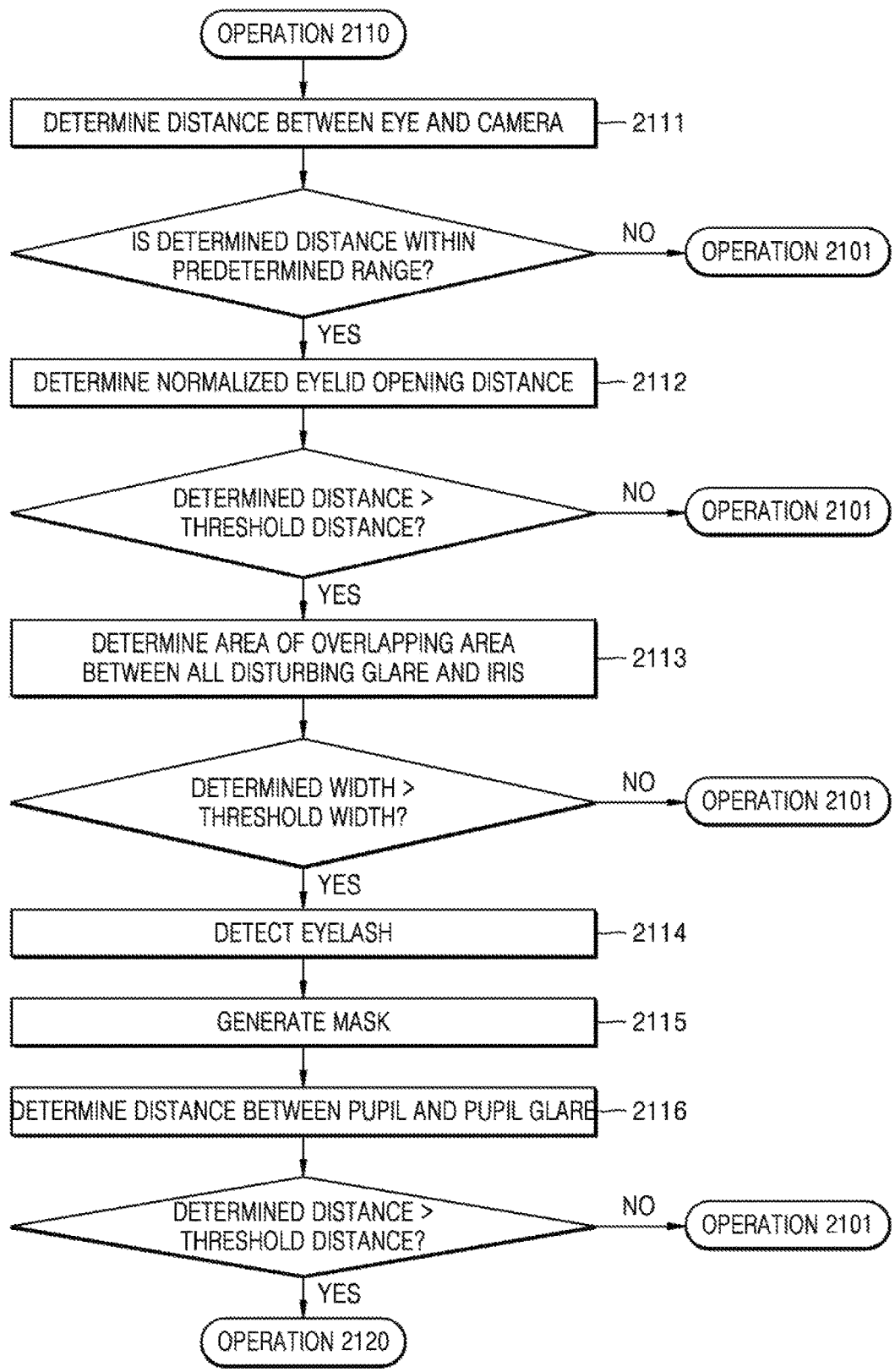
FIG. 27 is a flowchart of a method of determining quality of an iris image according to an embodiment of the present disclosure.

FIG. 27 is a detailed flowchart of a method of determining the quality of the iris image according to an embodiment of the present disclosure.

Referring to FIG. 27, operation 2110 may be implemented to include subordinate operations 2111, 2112, 2113, 2114, 2115, and 2116.

In operation 2111, the iris recognition apparatus 100 may determine a distance between an eye and a camera in the image. For example, the distance between the eye and the camera may be roughly estimated based on an average statistical radius Rstat of camera parameters and the human iris. A focal length f of the camera is determined in advance. A linear size of a pixel p of a photo-matrix of the camera is known. For example, the linear size of an element (pixel) of the photo-matrix may be calculated by dividing a length of each matrix by the number of elements (pixels) located along one direction. Therefore, the linear size of an iris radius projection Rproj on the photo-matrix may be calculated using Equation 4 below.

$$Rproj = Rpixels * p \text{ (Rpixels denotes a radius dimension of the pixel and } p \text{ denotes a pixel size)} \quad \text{Equation 4}$$

Figure 28:
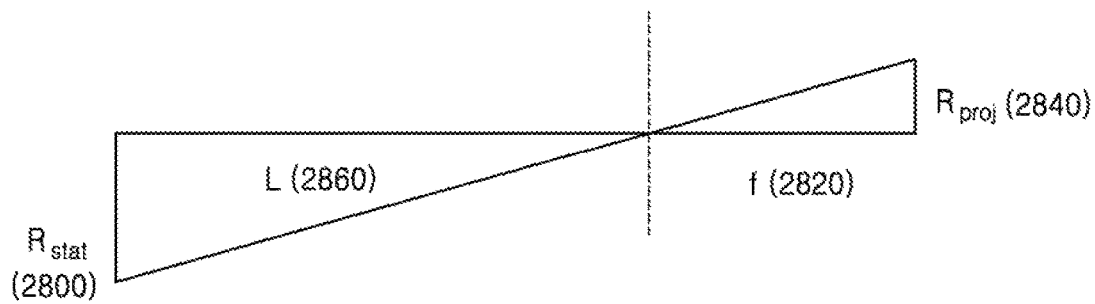
FIG. 28 shows relationships between an iris average statistical radius, a focal length, an iris radius projection, and a distance between an iris and a camera according to an embodiment of the present disclosure.

FIG. 28 shows relationships between an iris average statistical radius, a focal length, an iris radius projection, and a distance between an iris and a camera according to an embodiment of the present disclosure.

Referring to FIG. 28, a geometrical schema shows relationships between the iris average statistical radius Rstat 2800, the focal length f 2820, the iris radius projection Rproj 2840, and a distance between the iris and the camera L 2860. From geometrical properties of a triangle, the distance between the iris and the camera may be determined using Equation 5.

$$L = (f * Rstat) / Rproj \quad \text{Equation 5}$$

Referring back to FIG. 27, if the determined distance between the iris of the current image and the camera is not within a predetermined range, the iris recognition apparatus 100 according to the embodiment may determine that the current image is as an image unsuitable for iris recognition, discard the current image, and return to subordinate operation 2101 to acquire a next eye image from the image set, and trigger a feedback signal to at least one of the user and a hardware component. This is because an image having too long or short estimated distance between the eye and the camera is unsuitable for subsequent processing for iris recognition.

In operation 2112, the iris recognition apparatus 100 may determine a normalized eyelid opening distance EODistance of the current image. The normalized (relative) eyelid opening distance is a value that takes into account a facial characteristic (e.g., face sizes of different persons) of a person and is suitable for projection onto the photo-matrix of the camera represented in pixel units. Thus, the normalized eyelid opening distance may be used instead of the absolute eyelid opening distance determined in a previous operation (e.g., operation 842 of FIG. 17). For example, the normalized eyelid opening distance may be determined as a value obtained by dividing the eyelid opening distance by the pupil radius. If the determined normalized eyelid opening distance of the current image is smaller than a predetermined threshold distance, the iris recognition apparatus 100 according to the embodiment may determine that the current image is as an image unsuitable for iris recognition, discard the current image, and return to subordinate operation 2101 to acquire a next eye image from the image set, and trigger a feedback signal to at least one of the user and a hardware component. This is because the iris is not visible when the eye is not fully opened.

In operation 2113, the iris recognition apparatus 100 may determine an area of an overlapping area between the iris and all disturbing glare(s) present in a current image. A light figure collected in a previous operation (e.g., operation 822 of FIG. 10) may be considered a disturbing glare in present operation 2113. The iris recognition apparatus 100 may determine the area of the overlapping area with the iris area sequentially for each of the one or more disturbing glares in the current image. Since only the iris is required for an additional identification procedure, an overlapping part of a disturbing glare and an area other than the iris may not be considered. An area of the area where each of the disturbing glares overlaps with the iris may be calculated as a sum of the number of pixels belonging to each of the disturbance glare area and the iris area. If a width of the overlapping area determined for at least one of the one or more disturbing glares of the current image is greater than a predetermined critical width, the iris recognition apparatus 100 may determine that the current image is an image not suitable for iris recognition and return to operation 2101 to acquire a next image from the image set, and trigger a feedback signal to at least one of a user and a hardware component. This is because if an important part of the iris image is obscured by the disturbing glare, iris comparison accuracy may be lowered. An absolute measure value of the overlapping area may be used as well as a relative (normalized) measure value (a value obtained by dividing the overlapping area by an entire iris area) for a check of operation 2113.

In operation 2114, the iris recognition apparatus 100 may detect eyelashes from the image. Eyelash detection may be performed by an image texture comparison. A texture is an image fragment (pattern) that is characterized by a statistical index describing a pattern direction property and a spatial frequency. An area filled with an iris texture may be distinguished from an area filled with an eyelash texture. Various methods may be used to determine the statistical characteristic of the texture. For example, a Gabor filter may be used. Alternatively, a method such as a LBP transformation, a Fourier transformation, or the like may be used to determine an image texture characteristic. When the eyelash pattern area is distinguished from the iris pattern area, the eyelash area may be masked. The masked area in the image is not allowed to compare an iris code.

In operation 2115, the iris recognition apparatus 100 may generate a mask. The mask may be generated to exclude all pixels that are located in the iris area and obscured by other previously detected objects (eyelids, eyelashes, and glare) in an iris comparison process. The pixels that are excluded from the iris comparison process may be displayed in a variety of rational ways in the mask. For example, the iris recognition apparatus 100 may generate a mask that displays a pixel for which the iris comparison process is prohibited as 0 and a pixel for which the iris comparison process is not prohibited as 1. Alternatively, the iris recognition apparatus 100 may generate a mask including a list of pixels for which the iris comparison process is prohibited. The list of pixels for which the iris comparison process is prohibited may be generated based on coordinates of each pixel or an index of each pixel.

In operation 2116, the iris recognition apparatus 100 may determine a distance between the pupil and a pupil glare. For example, the distance between the pupil and the pupil glare may be determined as a value obtained by dividing a distance between a pupil center and a center of the pupil glare by an iris radius. For example, the distance between the pupil and the pupil glare may be calculated using Equation 6 below.

$$Cpg-Cp1/R \text{(where } Cpg \text{ denotes the center of the pupil glare, } Cp \text{ denotes the center of the pupil, and } R \text{ denotes the iris radius)} \quad \text{Equation 6}$$

If the determined distance between the pupil and the pupil glare of the current image is greater than a predetermined threshold distance, the iris recognition apparatus 100 may determine that the current image is an image unsuitable for iris recognition and discard the current image and return to operation 2101 to acquire a next eye image from the image set, and trigger a feedback signal to at least one of the user and the hardware component. It is referred to as a centering error (eccentricity) where the distance between the pupil and the pupil glare is greater than the threshold distance. Such a centering error may make it impossible to perform an iris image normalization operation of transforming iris polar coordinates into linear coordinates. The normalization operation is performed by assuming that the iris center is the same as the pupil center, and the iris center is selected as an origin of a polar coordinate system.

Referring back to FIG. 21, in operation 2120, the iris recognition apparatus 100 may normalize the iris image and check quality.

Figure 29:
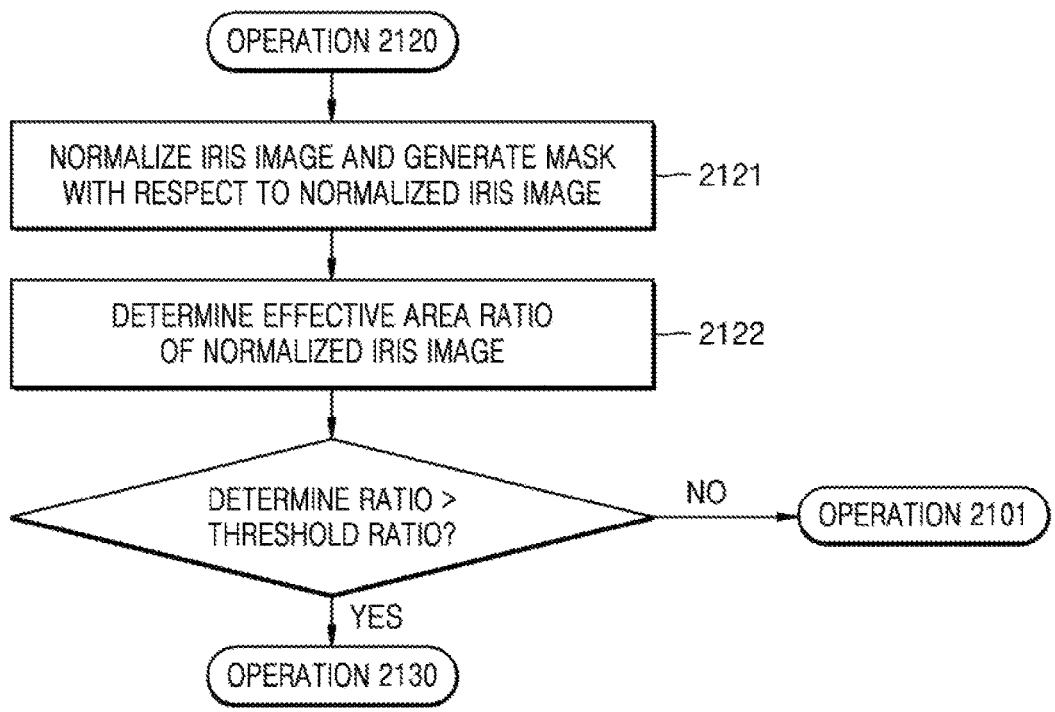
FIG. 29 is a detailed flowchart of normalizing an iris image and checking quality according to an embodiment of the present disclosure.

FIG. 29 is a detailed flowchart of normalizing the iris image and checking quality according to an embodiment of the present disclosure.

Referring to FIG. 29, operation 2120 may be implemented to include subordinate operations 2121 and 2122.

In operation 2121, the iris recognition apparatus 100 may normalize the iris image and generate a mask for the normalized iris image. Normalization may be defined as transforming pixels of an iris image from polar coordinates to linear coordinates.

FIG. 30 illustrates a method of normalizing an iris image according to an embodiment of the present disclosure.

Referring to FIG. 30, the pixels of the iris image may be transformed from circular locations into a rectangular matrix of the pixels through normalization. For example, a pixel 3000 located at (x, y) may be normalized and transformed into a pixel 3010 in a rectangular matrix.

Figure 31:
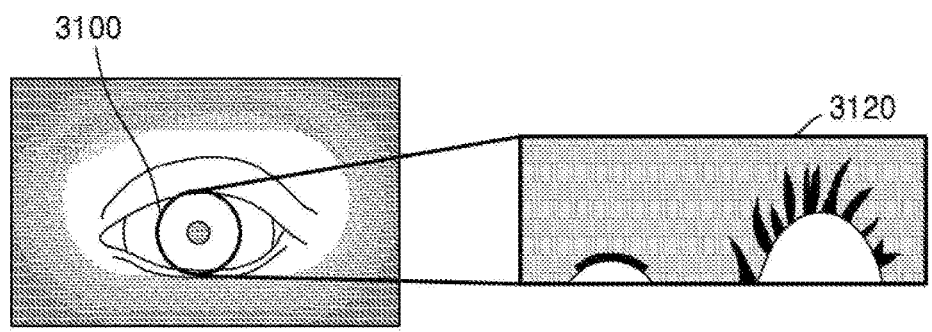
FIG. 31 illustrates a method of generating a normalized iris image according to an embodiment of the present disclosure.

FIG. 31 illustrates a method of generating a normalized iris image by performing a normalization operation on the iris image according to an embodiment of the present disclosure.

Referring to FIG. 31, the iris recognition apparatus 100 may perform a normalization operation on an iris image 3100 to generate a normalized iris image 3120. The mask may display specific points of the normalized iris image obscured by eyelids, eyelashes, glare, and the like. In a previous operation, since a location or an index of the pixel marked as an obscured part is determined, a method similar to iris image normalization which transforms polar coordinates into linear coordinates may be used for mask normalization. As described above, the mask may display pixels that are prohibited in the iris matching process. For example, the iris recognition apparatus 100 may generate a mask that indicates a point at which the iris matching process is prohibited as 0 and a point at which the iris matching process is permitted as 1. Alternatively, the iris recognition apparatus 100 according to the embodiment may generate a mask indicating a point at which the iris matching process is prohibited as 1 and a point at which the iris matching process is permitted as 0.

Figure 32:
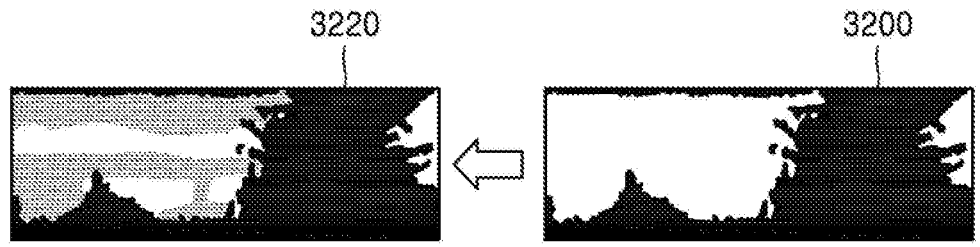
FIG. 32 illustrates a normalized iris image to which a mask is applied according to an embodiment of the present disclosure.

FIG. 32 illustrates a normalized iris image 3220 to which a mask 3200 is applied according to an embodiment of the present disclosure.

Figure 33:
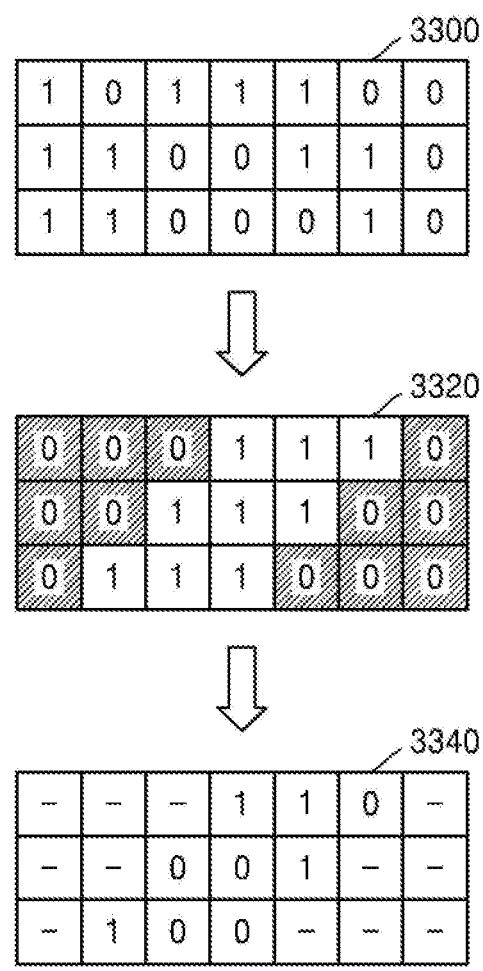
FIG. 33 illustrates a method of applying a mask to an iris code according to an embodiment of the present disclosure.

FIG. 33 illustrates a method of applying the mask 3320 to an iris code 3300 to generate an iris code 3340 that is ultimately used in an iris matching process according to an embodiment of the present disclosure.

Referring back to FIG. 29 in operation 2122, the iris recognition apparatus 100 may determine an effective area ratio (REA) in the normalized iris image. The REA may be determined using, for example, Equation 7 below.

$$\text{Effective area ratio=area of non-mask area/total area} \quad \text{Equation 7}$$

If the determined effective area ratio of the current image is smaller than a predetermined threshold ratio, the iris recognition apparatus 100 according to the embodiment may determine that the current image is an image unsuitable for iris recognition and discard the current image and return to operation 2101 to acquire a next eye image from the image set, and trigger a feedback signal to at least one of the user and the hardware component. If a non-masked area used in an iris comparison process is not large, it is unsuitable for performing a reliable comparison of each reference image and the iris image. If the selected N images fail to pass checks and are all discarded, the iris matching process fails. The iris recognition apparatus 100 may transmit a feedback signal to the user to acquire an additional image sequence.

Referring back to FIG. 21, in operation 2130, the iris recognition apparatus 100 may extract features of the normalized iris image. Feature extraction may be performed based on at least one of Gabor filtering, LBP transformation, Fourier transformation, and wavelet transformation. Gabor filtering may amplify image space harmonics with the most unique features and suppress image space harmonics with less unique features. The image space harmonics is similar to harmonics of the Fourier series of an image. Gabor filtering may transform pixel values of the iris image into a set of complex values, where each complex value may represent brightness of the corresponding pixel. The LBP transformation may calculate integer values for the pixels of the iris image. The LBP transformation is calculated as a relationship between a center point of a pattern defined for each pixel in the image and brightness between adjacent points, thereby amplifying a local variation in the image brightness. The local variation in brightness may be extracted as features of the iris image. In addition, an original image brightness value may be used directly as the image feature without any particular modification.

Figure 34:
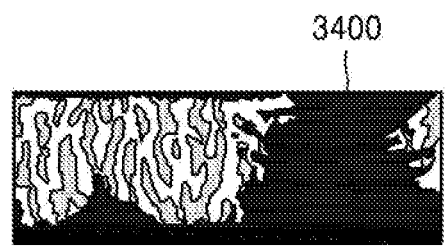
FIG. 34 illustrates a transformed image for extracting features from a normalized iris image according to an embodiment of the present disclosure.

FIG. 34 illustrates a transformed image for extracting features from a normalized iris image according to an embodiment of the present disclosure.

Referring to FIG. 34, an example image 3400 that is transformed into a normalized iris image is illustrated.

Referring back to FIG. 21, in operation 2140, the iris recognition apparatus 100 may encode an iris image and a mask. The iris recognition apparatus 100 may encode the normalized iris image having the extracted features and the mask and acquire an iris code in bit form and the mask. Encoding of the iris image and the mask may be performed based on at least one technique, such as a filter based on a Fourier transform, a filter based on wavelet transform, a local binary pattern, and the like. The iris recognition apparatus 100 may transform a complex number into a pair of bit values by performing encoding of a real number Re and an imaginary number Im of a complex number. Operation 2140 may further include a quantization step such as binarization. Quantization may mean transforming one complex value or a real value into one or two discrete values (e.g., bit values), respectively. For example, the complex value obtained based on Gabor transformation in operation 2130 may be encoded as a pair of bits based on a binarization scheme according to the following conditions.

If Re>0, Im>0, then {1, 1}
If Re>0, Im<0, then {1, 0}
If Re<0, Im<0, then {0, 0}
If Re<0, Im>0, then {0, 1}

However, any other encoding method may be used, and the present disclosure is not limited thereto. A bit representation of the iris image acquired through the binarization scheme may be referred to as an iris code.

Figure 35:
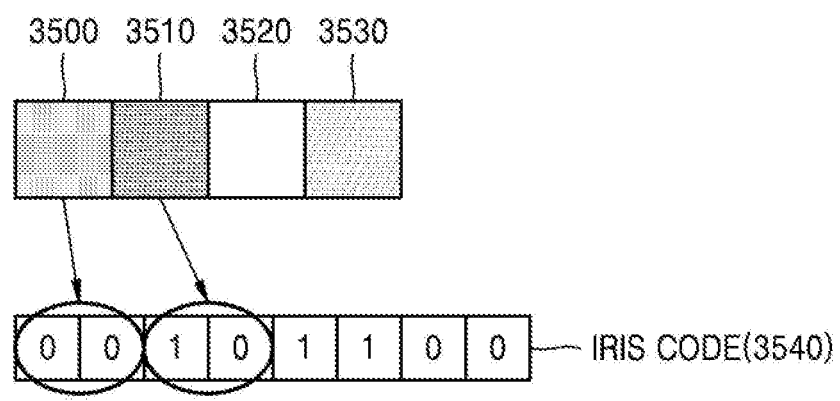
FIG. 35 illustrates an iris code generated by encoding a normalized iris image according to an embodiment of the present disclosure.

FIG. 35 illustrates an iris code generated by encoding a normalized iris image according to an embodiment of the present disclosure.

Referring to FIG. 35, the iris recognition apparatus 100 may generate two pieces of bit information for each of elements 3500, 3510, 3520, and 3530 of the normalized iris image to generate an iris code 3540.

An encoding method may be implemented using real numbers instead of complex numbers. A real number representing gray intensity of the normalized iris image may be binarized to one bit instead of two bits, as described above for the complex number. Also, the iris code is a bit representation of the normalized iris image, the bit representation is acquire in an encoding process, and a bit pair may correspond to one point in an original image according to quantization of the complex number.

The iris recognition apparatus 100 may use another method of feature extraction and encoding. For example, LBP transformation may be used for feature extraction and encoding. LBP transformation may transform the normalized iris image into an integer matrix (e.g., 8 bits or 16 bits, depending on a selected type of LBP).

The iris code in bit form and the mask may be finally transferred to the iris matching process. In the iris matching process, the iris recognition apparatus 100 according to the embodiment may compare the masked iris code (for example, 3340 in FIG. 33) with a reference iris code previously stored by a legitimate user of the iris recognition apparatus 100. Generation of the reference iris code may be performed by the legitimate user of the iris recognition apparatus 100, at least in some operations of the above-described method.

The above-described preparation method of the iris image may be used not only as a part of the iris comparison procedure (for example, a personal identification procedure), but also as a part of a method of building a database of iris images.

Figure 36:
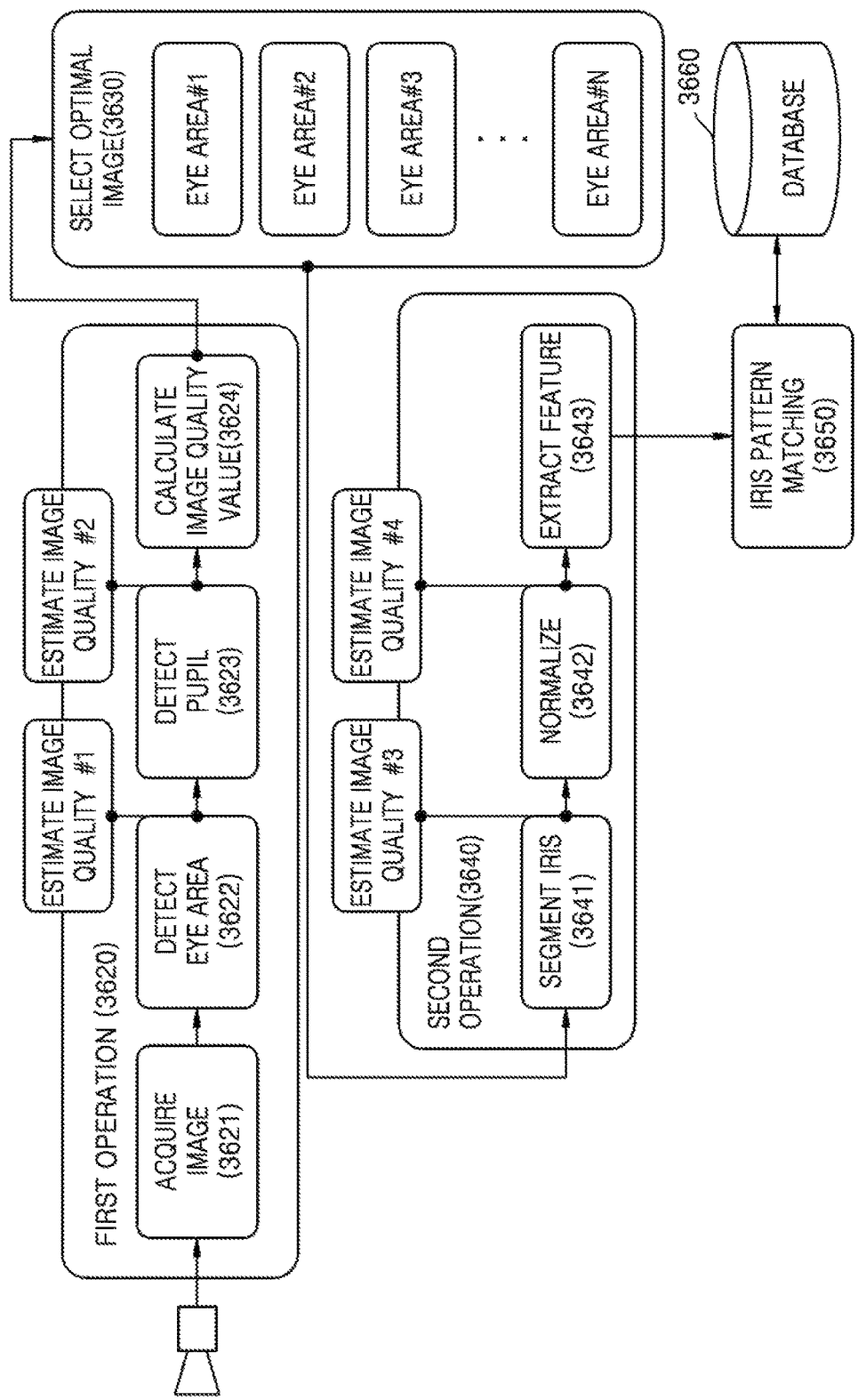
FIG. 36 is a flowchart of an iris recognition method according to an embodiment of the present disclosure.

FIG. 36 is a flowchart of an iris recognition method according to an embodiment of the present disclosure.

Referring to FIG. 36, the iris recognition method performed by the iris recognition apparatus 100 may include a first operation 3620 and a second operation 3640.

The first operation 3620 may be performed in real time on a partial image of each of a plurality of images contained in an acquired image sequence. The second operation 3640 may be performed on image optimally selected in first operation 3520.

The first operation 3620 may select one or more images suitable for iris recognition from the acquired image sequence. The first operation 3620 may include an image acquisition operation 3621, an eye area detection operation 3622, a pupil detection operation 3623, and an image quality value calculation operation 3624. Since an operation performed by the iris recognition apparatus 100 in each operation has been described above, a detailed description thereof will be omitted. The eye area detection operation 3622 and the pupil detection operation 3623 may include an operation of discarding an image unsuitable for iris recognition. Images remaining after discarding the image unsuitable for iris recognition in first operation 3620 may be collected as optimal images (operation 3630).

Second operation 3640 may detect an iris area and extract features from the selected one or more images. The second operation 3640 may include an iris segmentation operation 3641, a normalization operation 3642, and a feature extraction operation 3643. Since an operation performed by the iris recognition apparatus 100 in each operation has been described above, a detailed description thereof will be omitted. The iris segmentation operation 3641 and the normalization operation 3642 may further include an operation of additionally discarding an image unsuitable for iris recognition.

When second operation 3640 is completed, the iris recognition apparatus 100 may perform iris pattern matching in operation 3650. The iris pattern matching may be performed by comparing an iris code finally acquired from the image sequence with a reference iris code stored in a database 3660.

Figure 37:
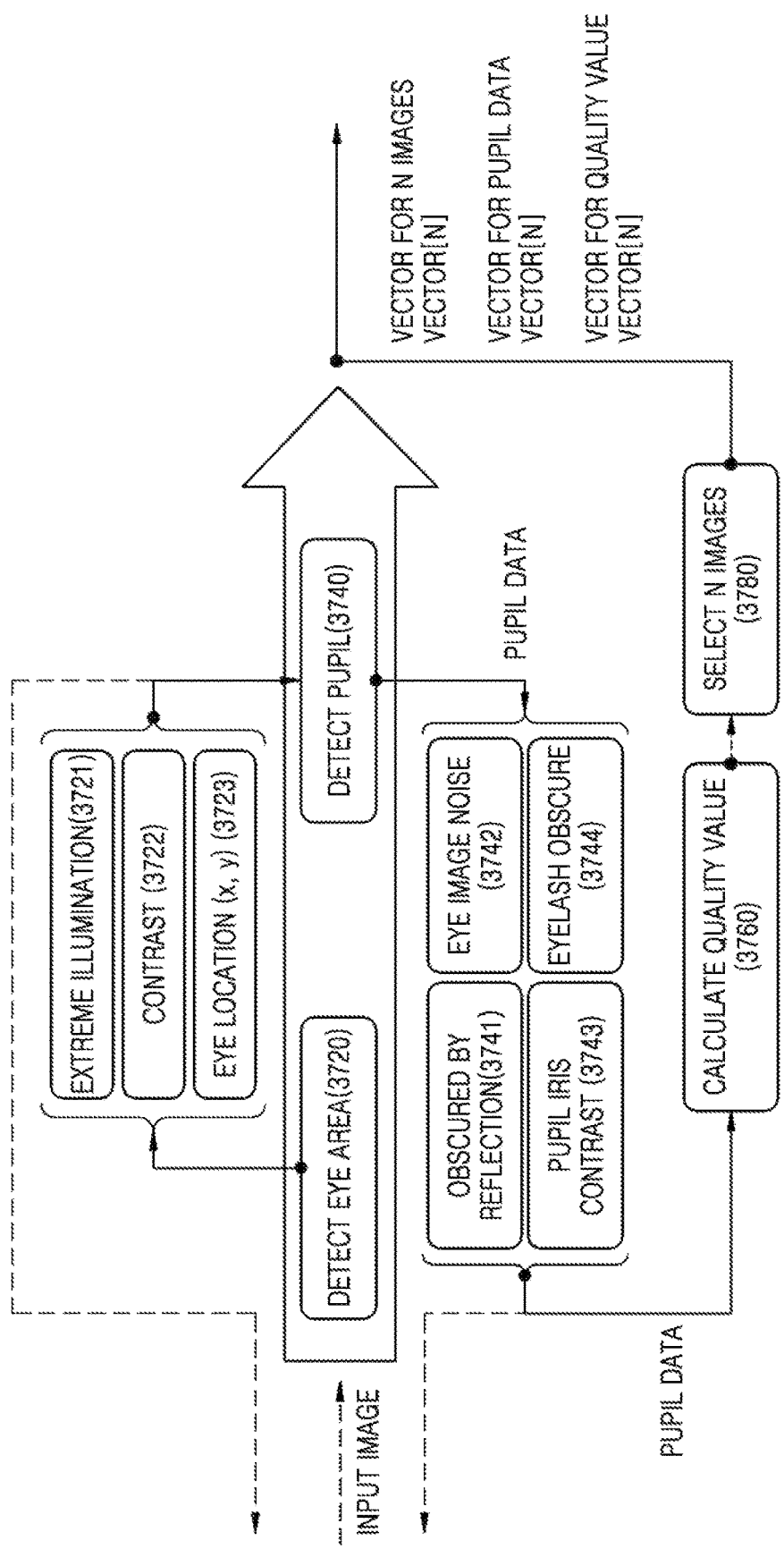
FIG. 37 shows a flowchart of a first operation of the iris recognition method of FIG. 36 according to an embodiment of the present disclosure.

FIG. 37 shows a flowchart of a first operation of the iris recognition method of FIG. 36 according to an embodiment of the present disclosure.

Referring to FIG. 37, the iris recognition method performed in the iris recognition apparatus 100 may include an eye area detection operation 3720 and a pupil detection operation 3740 to select one or more images suitable for iris recognition from a plurality of acquired images. The image sequence may include a plurality of images.

The iris recognition apparatus 100 may detect an eye area from an image in the eye area detection operation 3720. The iris recognition apparatus 100 may determine information about extreme illumination 3721, contrast 3722, and an eye location 3723 with respect to each of the images. The iris recognition apparatus 100 may determine an image unsuitable for iris recognition among a plurality of iris images based on the determined information. The determined information may be input to the pupil detection operation 3740.

The iris recognition apparatus 100 may determine a pupil area and generate pupil data in the pupil detection operation 3740. The pupil data may include information such as a pupil center, a pupil radius, and the like. The pupil data may further include information about occlusion 3741 by reflection, eye image noise 3742, pupil-iris contrast 3743, and eyelid occlusion 3744. The iris recognition apparatus 100 may determine an image unsuitable for iris recognition among the plurality of iris images based on the determined pupil data.

The iris recognition apparatus 100 may calculate a quality value for each of images that are not determined unsuitable for iris recognition in the quality value calculation operation 3760, and may finally select N images having the best quality based on the calculated quality value in N image selection operation 3780. The iris recognition apparatus 100 may output pupil data of each image and a quality value of each image in addition to the selected N images. The N images, the pupil data of each image, and the quality value of each image may be output in vector form (vector [N]).

An arrow in a broken line represents a feedback signal transmitted to at least one of a user and a hardware component, such as a camera and illumination. For example, the iris recognition apparatus 100 may transmit the feedback signal to at least one of the user and the hardware component based on at least one of the information about the extreme illumination 3721, the contrast 3722, and the eye position 3723. For example, the iris recognition apparatus 100 may transmit the feedback signal to at least one of the user and the hardware component based on at least one of the information about the occlusion 3741, the eye image noise 3742, and the pupil-iris contrast 3743.

Figure 38:
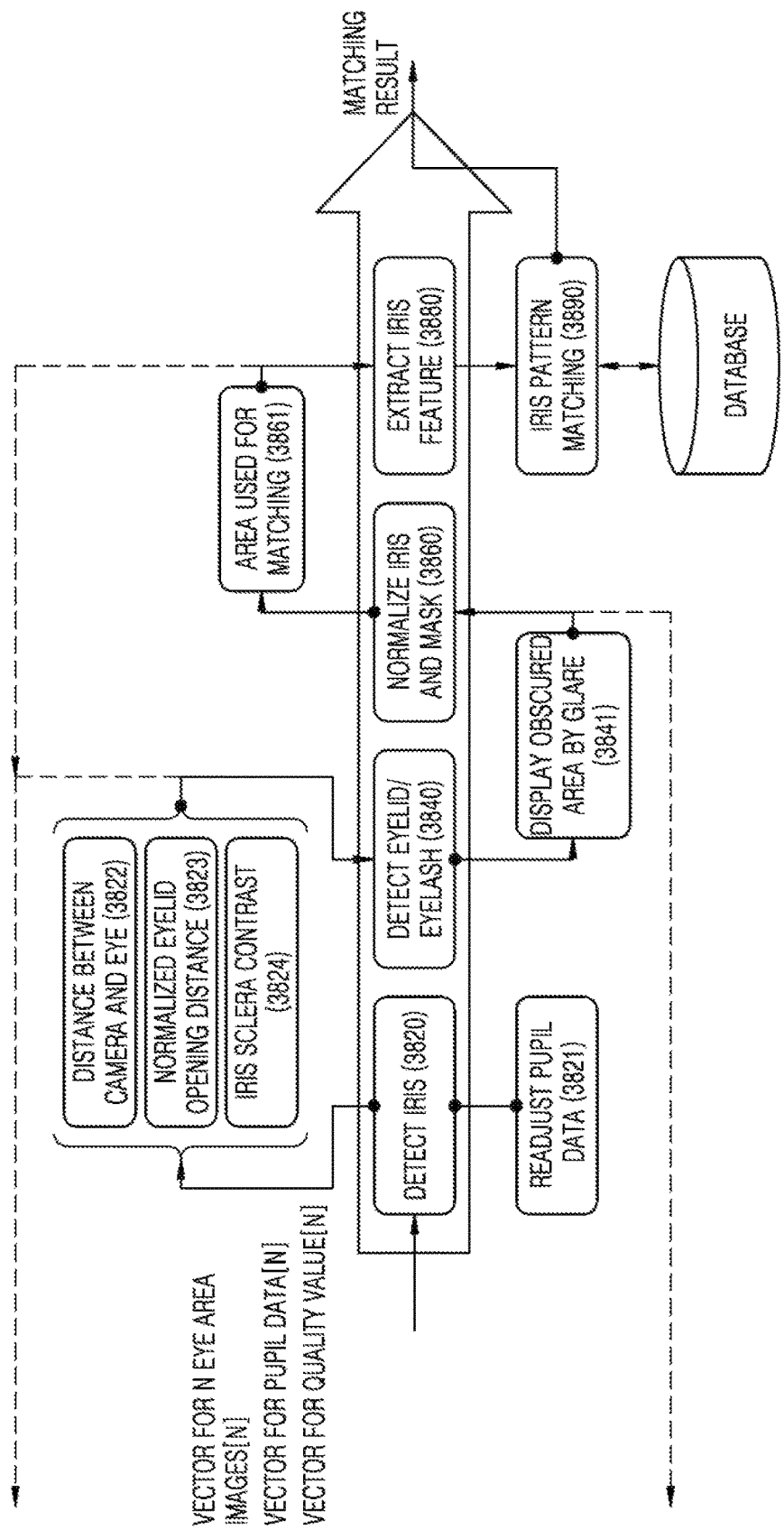
FIG. 38 shows a flowchart of a second operation of the iris recognition method of FIG. 36 according to an embodiment of the present disclosure.

FIG. 38 shows a flowchart of a second operation of the iris recognition method of FIG. 36 according to an embodiment of the present disclosure.

Referring to FIG. 38, the iris recognition method performed by the iris recognition apparatus 100 may include an iris detection operation 3820, an eyelid/eyelash detection operation 3840, an iris and mask normalization operation 3860, and an iris feature extraction operation 3880.

N images in vector form, pupil data of each image, and a quality value of each image output in operation 3780 of FIG. 37 may be input to the iris detection operation 3820.

The iris recognition apparatus 100 may detect an iris area for each image in iris detection operation 3820. The iris detection operation 3820 may include pupil data recalibration operation 3821. The iris recognition apparatus 100 may determine information about a distance 3822 between a camera and an eye, a normalized eyelid opening distance 3823 and an iris-sclera contrast 3824 in the iris detection operation 3820 and may further determine an image unsuitable for iris recognition based on the determined information.

In eyelid/eyelash detection operation 3840, the iris recognition apparatus 100 may detect an eyelid/eyelash area in an image. The eyelid/eyelash detection operation 3840 may include operation 3841 of displaying a masked area by a glare. The displayed area is not used for iris matching.

The iris recognition apparatus 100 may normalize an iris area in the image and generate a mask for the normalized iris area in iris and mask normalization operation 3860. Normalization may be defined as transforming pixels in the iris area from polar coordinates to linear coordinates. The generated mask may also be normalized. The iris and mask normalization operation 3860 may determine an area 3861 used for matching.

The iris recognition apparatus 100 may extract a feature of the normalized image in the iris feature extraction operation 3880. Feature extraction may be performed based on at least one of Gabor filtering, LBP transformation, Fourier transformation, and wavelet transformation.

In the iris pattern matching operation 3890, the iris recognition apparatus 100 may output a final matching result by comparing an iris code obtained in operation 3890 with a reference iris code stored in a database. The iris code may be acquired by performing encoding on the normalized image.

An arrow in a broken line represents a feedback signal transmitted to at least one of a user and a hardware component, such as the camera and illumination. For example, the iris recognition apparatus 100 may transmit the feedback signal to at least one of the user and the hardware component based on at least one of the information about the distance 3822 between the camera and the eye, the normalized eyelid opening distance 3823, and the iris-sclera contrast 3824.

Figure 39:
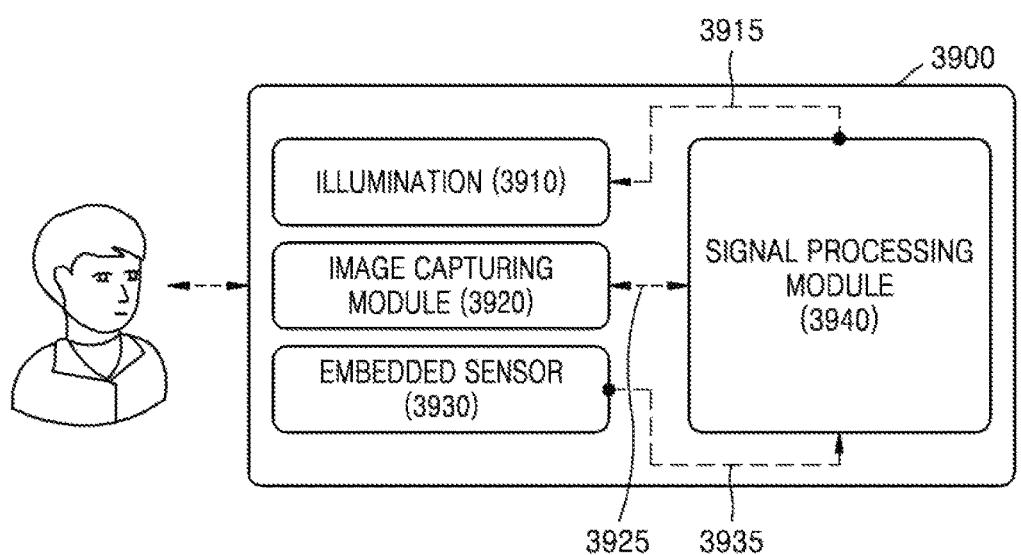
FIG. 39 is a block diagram of an iris recognition apparatus according to an embodiment of the present disclosure.

FIG. 39 is a block diagram of an iris recognition apparatus 3900 according to an embodiment of the present disclosure.

Referring to FIG. 39, the iris recognition apparatus 3900 is another embodiment of the iris recognition apparatus 100 illustrated in FIG. 1. A description provided with respect to the iris recognition apparatus 100 may also be applied to the iris recognition apparatus 3900 of FIG. 39. The iris recognition apparatus 3900 may be a mobile apparatus.

The iris recognition apparatus 3900 may include an illumination device 3910, an image capturing module 3920, an embedded sensor 3930, and a signal processing module 3940. The illumination device 3910 may be a light source such as a light-emitting diode (LED). The image capturing module 3920 may be a camera. The embedded sensor 3930 may include an illuminometer, a distance meter, and the like.

An arrow 3915 may represent a signal transmitted by the signal processing module 3940 to the illumination device 3910. The signal that the signal processing module 3940 transmits to the illumination device 3910 may include a feedback signal triggered for the illumination device 3910. For example, a feedback signal triggered with respect to the illumination may be a signal to reset power of the LED, a signal to reset an LED pulse delay, a signal to change a direction of the illumination, a signal to change a distribution of the illumination, etc.

An arrow 3925 may represent a signal transmitted between the signal processing module 3940 and image capturing module 3920. For example, a signal transmitted from the image capturing module 3920 to the signal processing module 3940 may include an image sequence, and a signal transmitted from the signal processing module 3940 to the image capturing module 3920 may include a signal to reset a focal distance, a signal to reset an exposure time, a signal to reset a capturing time, and the like.

An arrow 3935 may indicate a signal that an embedded sensor 3830 transmits to the signal processing module 3940. For example, the signal that the embedded sensor 3930 transmits to the signal processing module 3940 may include illumination data and sensor data such as distance information with a user. The signal processing module 3940 may send a signal to change intensity of the illumination to the illumination device 3910 based on the received illumination data to improve quality of the image sequence to be acquired. The signal processing module 3940 may output a message to the iris recognition apparatus 3900 to be located farther away from or near the user based on received distance data to the user in order to improve the quality of the image sequence to be acquired.

Figure 40:
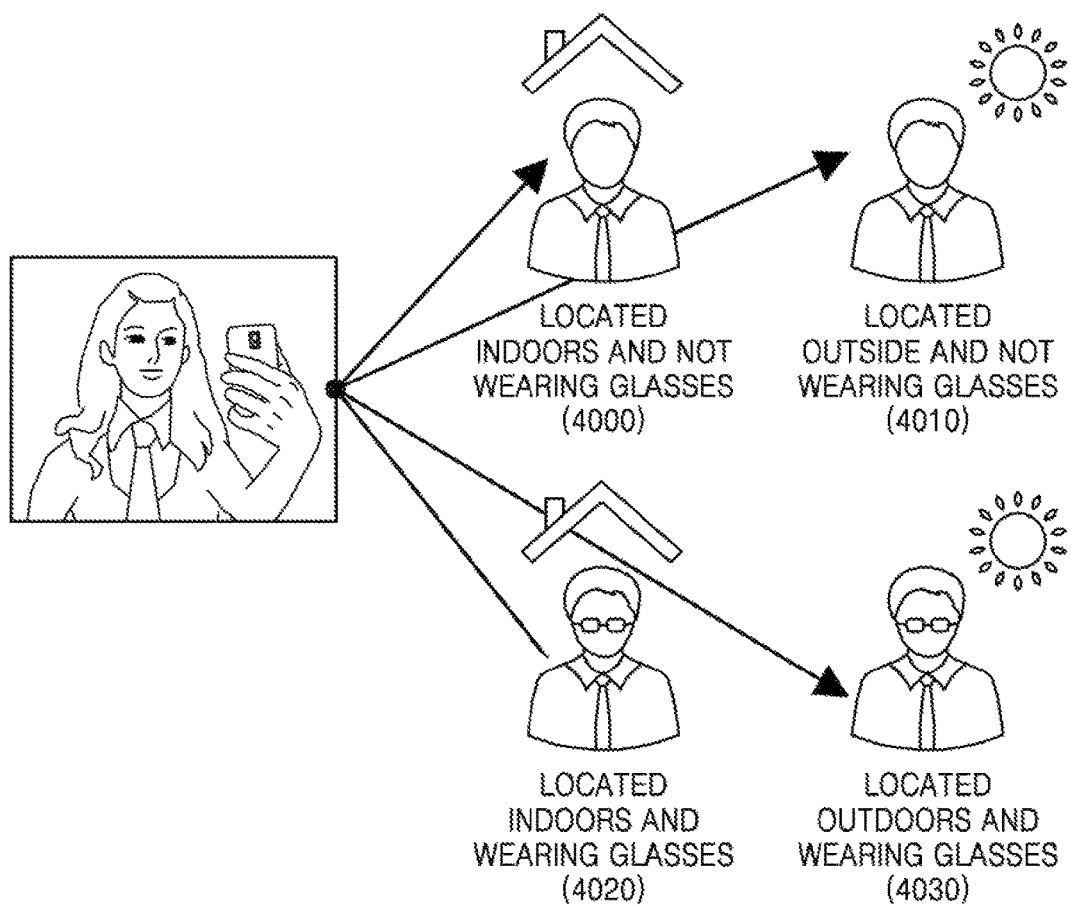
FIG. 40 shows various environments in which an iris recognition method according to an embodiment of the present disclosure.

FIG. 40 shows various environments in which an iris recognition method according to an embodiment of the present disclosure.

Referring to FIG. 40, the iris recognition method performed by the iris recognition apparatus 100 may be applied to a user of various embodiments such as a user 4000 located indoors and not wearing glasses, a user 4010 located outside and not wearing glasses, a user 4020 located indoors and wearing glasses, a user 4030 located outdoors and wearing glasses, and the like.

Meanwhile, the iris recognition method described above may be implemented as a computer-readable code on a non-transitory computer-readable recording medium. A non-transitory computer-readable recording medium includes all kinds of recording apparatuses in which data that may be read by a computer system is stored. Examples of the non-transitory computer-readable recording medium include read only memory (ROM), random access memory (RAM), compact disc ROMs (CD-ROM), magnetic tapes, floppy disks, optical data storage devices, and the like, and may also be implemented in the form of transmission over the Internet. In addition, the computer-readable recording medium may be distributed over network-connected computer systems so that code readable by the processor in a distributed manner may be stored and executed.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An apparatus for recognizing an iris, the apparatus comprising:
   an image acquisition circuitry configured to acquire a plurality of images; and
   a processor configured to:
      select at least one image for iris recognition from among the plurality of images based on pupil information of each of the plurality of images and image attribute information for an eye area of each of the plurality of images, and
      recognize an iris in the selected at least one image,
   wherein the pupil information comprises a pupil radius information and a pupil contrast information, and
   wherein the eye area is a portion of the at least one image containing a portion of a face containing an eye.

2. The apparatus of claim 1, wherein the processor is further configured to:
   generate an ellipse that approximates each of at least one light region included in each of the plurality of images,
   determine a pupil glare area based on at least one of an axial ratio, an area, or a contrast of the ellipse,
   determine a boundary of a pupil and the iris in the pupil glare area, and
   determine a pupil center information and the pupil radius information based on the boundary.

3. The apparatus of claim 1, wherein the processor is further configured to select the at least one image based on at least one of position information of an eye area, brightness information of the eye area, and contrast information of the eye area.

4. The apparatus of claim 1, wherein the processor is further configured to select the at least one image based on eyelid opening distance information that is determined as a length of a shortest vertical line among vertical lines that start from an arbitrary horizontal coordinate in an area comprising a pupil and ends at a boundary between the iris and an eyelid.

5. The apparatus of claim 1, wherein the processor is further configured to select the at least one image based on area information of a disturbing glare area that is determined based on each of one or more light regions that are included in each of the plurality of images.

6. The apparatus of claim 1, wherein the processor is further configured to select the at least one image based on distance information between a pupil and a disturbing glare that is between a pupil center and a center of each of one or more light regions that are included in each of the plurality of images.

7. The apparatus of claim 1,
   wherein, when a number of the at least one image is greater than a predetermined number, the processor is further configured to select the predetermined number of images from the at least one image based on an image quality value, and
   wherein the image quality value is determined based on at least one of the pupil radius information, a pupil center information, the pupil contrast information, or an eyelid opening distance information.

8. The apparatus of claim 1, wherein the processor is further configured to extract an iris image from the at least one image.

9. The apparatus of claim 8, wherein the processor is further configured to:
   determine a boundary of a sclera and an iris based on a brightness variation with respect to an area exceeding a pupil radius in an area defined along an arbitrary straight line starting from a pupil center, and
   determine an iris center and an iris radius based on the boundary.

10. The apparatus of claim 8, wherein the processor is further configured to select an image for iris recognition from the selected at least one image by considering at least one of information about an iris contrast, information about a pupillary dilatation ratio, or information about a distance between the pupil and the iris.

11. The apparatus of claim 8,
    wherein the processor is further configured to select a first image to be used for iris recognition from the at least one image by checking a quality of an iris image, and
    wherein the quality of the iris image is determined based on at least one of information about a distance between an eye and a camera, information about a normalized eyelid opening distance, information about an overlapping area between the iris and a disturbing glare, or information about a distance between a pupil and a pupil glare.

12. The apparatus of claim 11, wherein the information about the distance between the eye and the camera is determined based on an average statistical radius of a camera parameter and the iris.

13. The apparatus of claim 8,
    wherein the processor is further configured to:
       normalize the iris image,
       generate a mask with respect to the normalized iris image,
       extract a feature from the normalized iris image, and encode the normalized iris image and the mask, and
    wherein the mask displays a point obscured by at least one of an eyelid, an eyelash, or a glare area in the normalized iris image.

14. The apparatus of claim 1, wherein, the processor is further configured to:
    determine if the plurality of images are unsuitable for iris recognition, and
    when the plurality of images are unsuitable for iris recognition, transmit a feedback signal to the image acquisition circuitry or output a message to request a user to adjust a state of an eye.

15. The apparatus of claim 1, wherein the processor is further configured to transmit a feedback signal to the image acquisition circuitry or output a message to request a user to adjust a state of an eye based on sensor data received from one or more sensors.

16. A method for recognizing an iris, the method comprising:
   acquiring, using a camera, a plurality of images; and
   selecting, using a processor of an iris recognition apparatus, at least one image for iris recognition from among the plurality of images based on pupil information of each of the plurality of images and image attribute information for an eye area of each of the plurality of images; and
   recognizing, using the processor, an iris in the selected at least one image,
   wherein the pupil information comprises a pupil radius information and a pupil contrast information, and
   wherein the eye area is a portion of the at least one image containing a portion of a face containing an eye.

17. The method of claim 16, wherein the selecting of the at least one image comprises:
   generating an ellipse that approximates each of at least one light region included in each of the plurality of images;
   determining a pupil glare area based on at least one of an axial ratio, an area, or a contrast of the ellipse;
   determining a boundary of a pupil and the iris in the pupil glare area; and
   determining a pupil center information and the pupil radius information based on the boundary.

18. The method of claim 16, further comprising:
   determining if the plurality of images are unsuitable for iris recognition; and
   when the plurality of images are unsuitable for iris recognition, transmitting a feedback signal to an image acquisition circuitry or outputting a message requesting a user to adjust a state of an eye is output.

19. The method of claim 16, further comprising transmitting a feedback signal to control an image acquisition circuitry or outputting a message requesting a user to adjust a state of an eye based on sensor data received from one or more sensors.

20. A non-transitory computer-readable recording medium having recorded thereon a computer program for executing a method of claim 16.

* * * * *